(12) United States Patent
Donahue et al.

(10) Patent No.: US 7,669,542 B2
(45) Date of Patent: Mar. 2, 2010

(54) CONVERTIBLE TOP FOR YACHT

(75) Inventors: John N. Donahue, Tiverton, RI (US);
David L. Draper, Charlevoix, MI (US);
John Eustis, Saunderstown, RI (US);
Keith Attee, Charlevoix, MI (US)

(73) Assignee: The Talaria Company, LLC, Portsmouth, RI (US)

(*) Notice: Subject to any disclaimer, the term of this patent is extended or adjusted under 35 U.S.C. 154(b) by 115 days.

(21) Appl. No.: 11/833,006

(22) Filed: Aug. 2, 2007

(65) Prior Publication Data
US 2008/0066671 A1 Mar. 20, 2008

Related U.S. Application Data

(60) Provisional application No. 60/835,052, filed on Aug. 2, 2006.

(51) Int. Cl.
*B63B 17/00* (2006.01)
(52) U.S. Cl. .......................... 114/361; 440/5
(58) Field of Classification Search ............ 114/361; 440/5
See application file for complete search history.

(56) References Cited

U.S. PATENT DOCUMENTS

| | | | |
|---|---|---|---|
| 3,371,672 A | | 3/1968 | Hale et al. |
| 3,823,431 A | * | 7/1974 | Miller .................. 114/361 |
| 4,091,484 A | | 5/1978 | Means |
| 4,991,902 A | | 2/1991 | Schrader et al. |
| 5,067,768 A | | 11/1991 | Fischbach |
| 5,225,747 A | * | 7/1993 | Helms et al. ............. 318/265 |
| 5,476,400 A | * | 12/1995 | Theophanides ............ 440/5 |
| 5,667,269 A | | 9/1997 | Prenger et al. |
| 6,048,021 A | * | 4/2000 | Sautter, Jr. .............. 296/117 |
| 6,209,477 B1 | | 4/2001 | Biedenweg |
| 6,592,168 B2 | | 7/2003 | Hasselgruber et al. |
| 6,666,494 B2 | | 12/2003 | Antreich |
| 6,966,599 B2 | | 11/2005 | Willard |
| 6,983,716 B1 | | 1/2006 | Ankney et al. |
| 7,159,530 B1 | | 1/2007 | Shearer et al. |
| 2002/0090866 A1 | * | 7/2002 | Hoshina .................. 440/84 |
| 2005/0061226 A1 | | 3/2005 | Warfel et al. |
| 2007/0095272 A1 | | 5/2007 | Shearer et al. |

OTHER PUBLICATIONS www.awgamajestic.com/aquamajestic.htm—webpage from Jul. 2006.
www.rivaboats.com//visitors/index.php?;amg=en&page=modelli &mod=sunrival&details=tech, pp. 1-3—webpage from Jul. 2007.
www.rivaboats.com//visitors/index.php?;amg=en&page=modelli &mod=sunrival&details=photo, pp. 1-2—webpage from Jul. 2007.

* cited by examiner

*Primary Examiner*—Stephen Avila
(74) *Attorney, Agent, or Firm*—Goodwin Procter LLP

(57) ABSTRACT

A retractable convertible top for a pleasure craft, including a canvas type fabric and stowable linkage mechanism, is described. This convertible top may be fully deployed and retracted automatically to provide a quick and efficient means of providing shelter for the open cabin of a pleasure craft while still allowing easy entrance and egress from the cabin when the top is fully deployed. The convertible top may be fully stowable within a small volume storage bin with watertight covers. The stowage bin may be integrated into the craft. The craft's existing hydraulic and control systems may be utilized to automatically deploy and retract the convertible top.

20 Claims, 15 Drawing Sheets

Plan View
(Looking Down)

Front Elevation
(Looking Aft)

CONVERTIBLE TOP FOR YACHT

CROSS-REFERENCE TO RELATED APPLICATIONS

This application claims priority to and the benefit of U.S. provisional patent application Ser. No. 60/835,052 filed Aug. 2, 2006, the disclosure of which is being incorporated herein by reference in its entirety.

FIELD OF THE INVENTION

The present invention relates generally to the field of yachting, and more specifically to a retractable convertible top for pleasure craft including a fabric cover and a stowable linkage mechanism.

BACKGROUND OF THE INVENTION

The use of removable canopies in pleasure craft to protect passengers from the elements, such as rain, wind or sun, can be of great benefit to the pleasure boating community. By providing a removable means of covering an open cabin or deck, or a portion thereof, pleasure boaters may be free to enjoy the use of their craft under a wide variety of weather conditions, while also providing a convenient means of protecting the open cabin or deck from excessive weathering due to prolonged exposure to the elements. Removable canopies may also be of use in other boating fields, such as, but not limited to, rescue boats, racing boats, or any other small craft used for leisure or commercial activities where a removable cover for an open cabin or deck may be advantageous.

Traditionally, removable covers for boating have often taken the form of "Bimini" type tops, which are lightweight structures that can be manually mounted to a watercraft to provide a cover for at least a portion of a boat. These tops may include either soft tops or hard tops, but all generally require manual installation that can only be carried out safely when the boat is at rest and in calm waters. As these tops are generally lightweight, to allow for manual installation and easy carrying and stowage, they are generally structurally relatively weak, and cannot withstand high loading. These bimini style tops also require additional intermediate struts to be manually fitted between the support struts, to lock the bimini top and support structure in position.

More recently, electronically deployable bimini type tops have been incorporated into boats to provide shelter for passengers. For example, the Sunriva 33 pleasure yacht, manufactured by Riva Yachts, incorporates a retractable hood that is housed within the bow of the yacht and can be electronically deployed to cover the passenger section at the bow of the yacht. However, this hood only provides cover for a small section at the prow of the boat, while obstructing the drivers view ahead. The hood is also relatively light-weight, and not designed to be used while the boat is underway.

Another deployable top has been installed into the Aquamajestic 27 sports boat, manufactured by Kencraft Marine Pty Ltd. This top incorporates a remotely operated convertible roof that can deploy over the open cabin of the boat in a similar manner to the deployment of a convertible top on an automobile. However, this cover completely encloses the cabin of the boat, and does not provide passengers with a means of entering or exiting the boat when deployed.

SUMMARY OF THE INVENTION

From the foregoing, there exists a need for a structurally robust convertible top for a pleasure craft and/or other small craft capable of fully automated deployment and retraction to provide a quick means of providing shelter for the open cabin of a pleasure craft, while still allowing easy entrance and exit from the cabin when the top is fully deployed. There is also a need for a convertible top that may be fully stowable within a small volume storage bin with watertight covers, that may be integrated into the craft, where the crafts existing hydraulic and control systems may be utilized to automatically deploy and retract the convertible top.

One aspect of the invention includes a retractable cover for a boat. The retractable cover can include a linkage system, a canopy coupled to the linkage system, a control system, and a stowage bin. The control system can be adapted to control at least one of a deployment and retraction of the canopy. The stowage bin can be located to a rear of an open cabin of the boat. The canopy can be deployed to cover at least a portion of the open cabin while providing a passenger access and egress from the cabin.

In one embodiment, the control system can include a hydraulically powered system. The control system can be adapted to control multiple functions on the boat. In one embodiment, the control system can be adapted to control at least one of a steering function and a propulsion function of the boat. In one embodiment, a plurality of the multiple functions are powered by the hydraulically powered system.

In one embodiment, the control system can include a two button user interface or a three button user interface. In one embodiment, the linkage system can include a plurality of support struts. The plurality of support struts can include at least one support leg, at least one extension arm, at least one top bow, and at least one header. At least two of the plurality of support struts can be coupled together by a pivotable joint. The at least one header can be collapsible. The at least one header can be adapted to extend from and retract into the at least one extension arm. The at least one header can be releasably coupled to a windshield frame of the boat. In one embodiment, the cover can be adapted to be deployed while the boat is underway.

In one embodiment the control system can be adapted to retract the deployed canopy into the stowage bin. In one embodiment, a retraction function of the deployed canopy can be paused at a predetermined position to allow for visual inspection and adjustment of the collapsing canopy. The retraction function of the canopy can be paused in response to a signal from at least one sensor. The at least one sensor can include at least one optical sensor and/or at least one pressure sensor.

The ratio of deployed canopy length to stowed canopy length can be at least about 6:1, at least about 8:1, or at least about 10:1. The canopy can be adapted to extend over an area of at least 8 ft by 14 ft when deployed.

The linkage system can include at least one pivot point coupling the linkage system to at least one anchoring point located within the stowage bin. The at least one anchoring point and pivot point can be adapted to support the combined weight of the linkage system and canopy when deployed. The combined weight of the linkage system and canopy can be at least 300 lbs or at least 400 lbs. In one embodiment, a center of gravity of the combined linkage system and canopy can be approximately 7 ft forward of the at least one anchoring point when deployed. The stowage bin can include a plurality of hatches. At least one of the plurality of hatches can be adapted to be opened and closed automatically in response to a signal from the control system.

Another aspect of the invention can include a control system for controlling a plurality of functions on a boat. The control system can include a user interface, a processor, and a power system at least partially controlled by the processor. The power system can be adapted to provide power to a retractable cover and at least one other function of a boat. The at least one other function can include at least one of a bow thruster, a windlass, an engine hatch, a hatch cover for the retractable cover, a boarding rail, a jet bucket, and a steering nozzle.

In one embodiment, the power system can include hydraulics. The power system can further include one or more valves adapted to direct power from the power system to at least one of the retractable cover and the at least one other function. In one embodiment, the control system can further include a restriction function adapted to prevent at least one other boat function from operating upon a set condition not being met.

In one embodiment, the user interface can include at least one of a button, a joystick, a switch, a keypad, a stick control system, a touch pad, a keypad, and combinations thereof. The user interface can further include an electrical interconnect adapted to switch the control system between boat functions. The user interface can further include an indicator element. The indicator element can include at least one of a light, an LED, a buzzer, a message on a graphical interface, a mechanical indicator, and combinations thereof.

In one embodiment, different user interface elements can be adapted to control different boat functions. In one embodiment, the control system can be adapted to provide a substantially constant deployment and retraction rate for the retractable cover.

In one embodiment, the retractable cover can include a linkage system, a canopy coupled to the linkage system, a control system adapted to control at least one of a deployment and retraction of the canopy, and a stowage bin. The stowage bin can be located to a rear of an open cabin of the boat. The canopy can be deployed to cover at least a portion of the open cabin while providing a passenger access and egress from the cabin. In one embodiment, the control system can be adapted to pause the retractable cover at a set location during retraction to allow for user assisted stowage of the canopy.

Another aspect of the invention can include a method of operating a retractable cover for a boat canopy. The method can include the steps of opening a hatch, deploying a cover if at least one operating condition is met, and securing the cover in a deployed condition. The method can further include the step of retracting the cover from the deployed condition if at least one operating condition is met.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION OF THE INVENTION

Figure 1A:
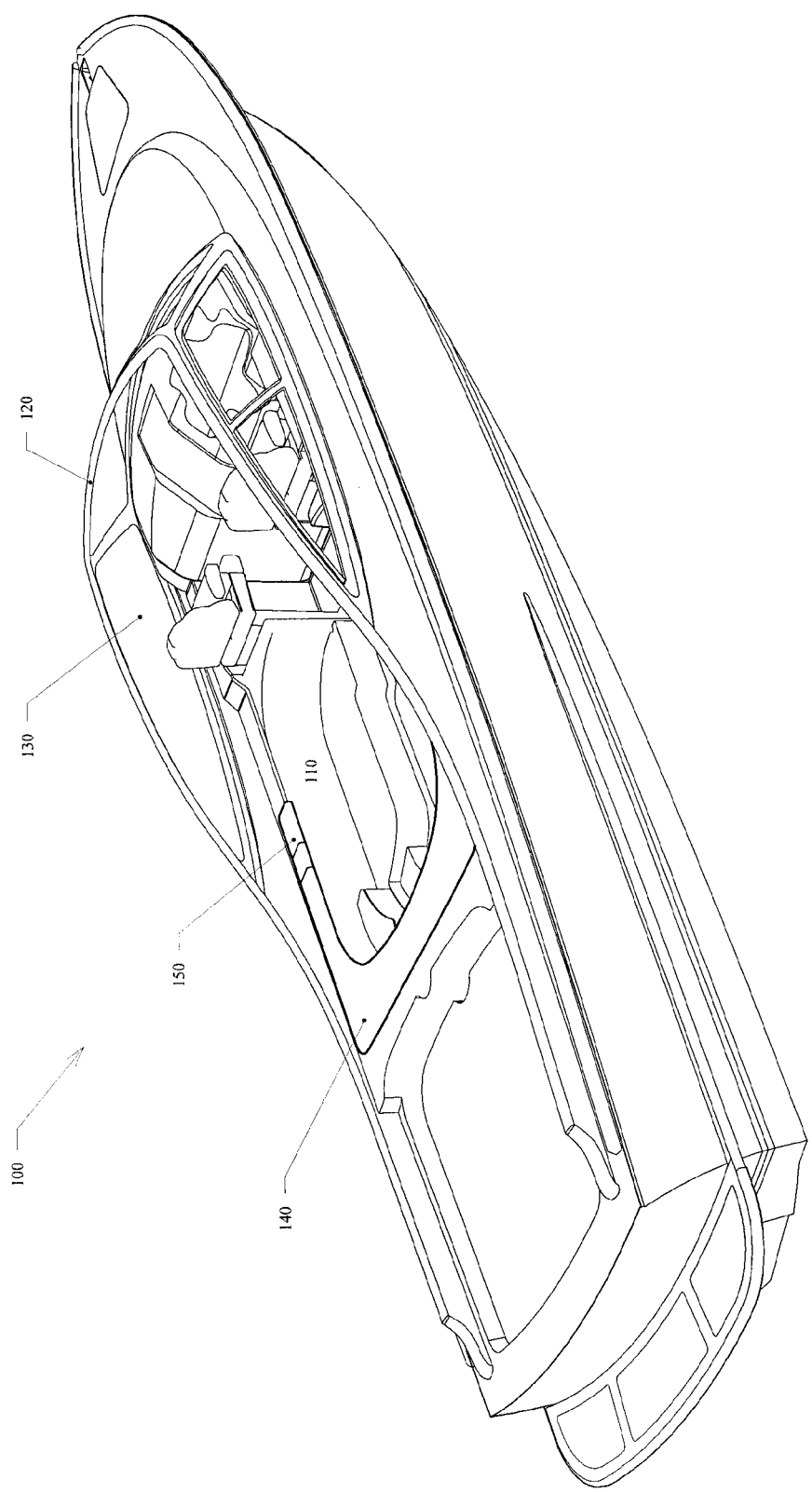
FIG. 1A is a schematic perspective view of a boat with a convertible top in the fully stowed position, in accordance with one embodiment of the invention.

The invention relates to a convertible top for a water craft, such as a motor driven or sail driven yacht, cabin cruiser, sailboat, motorboat, or other pleasure craft. The convertible top can provide the water craft with an uncovered cabin section during good weather, while providing a means of quickly and safely covering the cabin section during periods of more inclement weather, or when otherwise desired. When not deployed, the convertible top can be stowed away and covered so as to be protected from damage while also being hidden from view. The convertible top may be deployed and retracted automatically, with little or no human intervention required.

The convertible top may include a fabric canopy top and a linkage system to deploy and retract the canopy between a stowed position and a fully deployed position. The canopy and associated linkage system or support structure may be stowed in a stowage bin located at the rear of the open cabin of the boat. Hatches may cover this stowage bin to secure the canopy and linkage system when stowed, and to cover the empty stowage bin when the canopy is deployed. In an alternative embodiment, the stowage bin may be located at a different location on the boat, such as, but not limited to, in front of the open cabin of the boat or along one or more sides of the boat.

In one embodiment of the invention, the canopy may consist of a fabric top including a flexible material such as, but not limited to, canvas, vinyl, synthetic or natural polymers, plastic, or other suitable material, either alone or in a multi-layered construction. The material should be strong and durable enough to withstand repeated deployments and re-foldings without damage. In one embodiment, the canopy material may be waterproof. The canopy material may also be washable, mold and/or stain resistant, and resistant to creasing. In one example embodiment, canvas or vinyl materials produced by The Haartz Corporation of Acton, Mass. may be used for the canopy.

In one embodiment, the canopy may be made from an elastic material that may stretch during deployment. Allowing the canopy to stretch by a set amount may allow for a more compact storage compartment, and may also result in a more stable canopy when deployed. The amount of stretch of the material may range from very little stretch, such that the material only stretches by a small amount when fully deployed, to a large amount of stretch, depending upon the particular material being used and the specific requirements of the canopy. In an alternative embodiment, the canopy material may not stretch at all, or may only stretch by a minimal amount during deployment to maintain a tight fit over the support structure.

In one embodiment of the invention, the linkage system can include support struts. These struts can include a number of support legs extending from one or more pivot points mounted within either side of the craft. One or more extension arms may be mounted onto the support legs, with these arms extending forward in a substantially horizontal orientation towards the front of the cabin of the craft when deployed. One or more top bows may extend across the craft and mount to one or more of the support legs and/or extension arms. These top bows can thus provide support for a canopy coupled to the linkage system, such that the canopy can extend over at least a portion of the open cabin of the craft when deployed. A header, which can be used to releasably attach the canopy to the windshield frame or other fixed structure of the cabin, may be mounted at the distal end of the extension arms.

During deployment, the linkage system according to the invention is able to withstand both a high static loading, due to the weight of the linkage system and canopy, and a high dynamic loading from any possible pitching, rolling, and/or yawing of the craft in the water, and from wind impinging upon the canopy. Wind, and the pitching, rolling, and yawing of the craft, may also produce dynamic loads on the linkage system at any time while the canopy is deployed. The struts and pivots therefore are adapted to have sufficient strength to withstand the loading placed upon them during deployment, while deployed, and during retraction of the canopy, while also adding the minimal possible weight to the craft. Heavier struts and pivots add to the weight of the linkage system and can therefore increase the loading on the linkage system during deployment. Heavier struts and pivots also add to the weight of the craft as a whole, and can therefore have a detrimental effect on the crafts performance. As such, the struts may be designed to provide the maximum strength for the minimum weight. Possible strut materials may include, but are not limited to, stainless steel, aluminum, plastics, carbon fiber composites, or other appropriate material.

The shape of the struts may also be important to the design of the linkage system. In one embodiment of the invention, the support struts may have an elliptical or oval cross-section, while in other embodiments the support struts may have circular, square, rectangular or any other appropriately shaped cross-sections. The struts may be either hollow or solid. In one embodiment, one or more of the struts may include a number of shapes and/or materials. For example, a strut may include a solid metal plate (such as iron, stainless steel, aluminum, or other appropriate material) to provide the required strength, with shaped caps attached to the sides of the plate. These caps may, for example, be shaped as half ellipses, in order to provide the overall strut with an elliptical cross-section. The caps may be wooden (such as teak, mahogany, or other appropriate material), metal, or plastic, depending upon the structural and aesthetic requirements of the system. In an example embodiment, a strut includes a ¼ inch thick rectangular steel plate with semi-elliptical teak caps abutting the two wide sides of the plate.

In one embodiment, the plate may be completely surrounded by the caps. Alternatively, the caps may only cover the top and bottom of the plate, with the edges of the plate exposed. The plate may be rectangular, square, or elliptical in cross section. In an alternative embodiment, the struts may include an inner core of elliptical, circular, rectangular, square, or other appropriately shaped cross-section, with an outer material covering the inner core. In an alternative embodiment, one or more struts may include a plurality of plates and/or outer layers.

The individual support struts used in the linkage system may be connected by rotary joints, hinge joints, ball joints, clevis rod or yoke end linkages, U-joints, or any other appropriate pivoting linkages or combinations thereof. Each linkage may be carefully chosen and manufactured to provide the appropriate range of pivot of the support struts with respect to each other upon deployment and stowage of the convertible top.

Due to the high static and dynamic loadings that the convertible top may be exposed to during deployment and stowage, and also while deployed, the linkages between the support struts should be able to withstand significant static and dynamic loads throughout repeated deployments. The linkages should also be strong and "tight" enough to resist and minimize any flex in the system. As a result, in one embodiment, the pivoting linkages may be manufactured to tight engineering tolerances to minimize the "play" of the linkages as the convertible top is deployed or retracted. In one embodiment, the pivoting linkages may be manufactured from a wear resistant material to minimize fatigue in the system throughout repeated use. In one embodiment, lock fasteners, "torqued-up" against the shoulder bolt of a pivoting linkage, may be used to provide a tightly fitted pivoting linkage.

When not deployed, the convertible top may be stored in a watertight stowage bin located at the rear of the open cabin of the water craft. This stowage bin may be designed to fit into, and conform with, the rear of the open cabin of the boat, such that the bin is relatively unnoticeable when closed. Due to the limited space within the boat, the volume of the stowage space should be minimized.

FIGS. 1A-1F shows one embodiment of a convertible top for a water craft in a variety of positions, from fully stowed to fully deployed. The water craft with a convertible top fully stowed within a stowage bin can be seen in FIG. 1A. In this embodiment, a boat 100 with an open cabin 110 includes a stowage bin at the rear of the cabin to accommodate a stowed convertible top. The stowage bin is covered by a rear hatch 140, located at the rear of the open cabin 110, and two side hatches 150, located along the port and starboard sides of the open cabin 110 directly in front of, and adjacent to, the front edges of the rear hatch 140. The boat 100 can also include a windshield 130 held within a windshield frame 120, that can protect the passengers in the open cabin 110 from wind and spray while the boat is underway.

When closed, the rear hatch 140 and side hatches 150 can provide a waterproof cover for the stowage bin, protecting the convertible top from the elements while also hiding it from view. In the embodiment of FIG. 1A, the rear hatch 140 and side hatches 150 fit into the surrounding deck and paneling of the interior of the boat 100, such that, when in a stowed configuration, a casual observer would be unable to tell that a stowage bin and convertible top were housed within the rear of the open cabin 110. The hatch, or hatches, covering the stowage bin may be made from wood, plastic, metal, or any other appropriate material. In an alternative embodiment, one or more hatch may include a flexible material, such as a waterproof canvas or vinyl, held in a frame. The hatch, or hatches, may include a sealing means, such as a rubber seal, to provide a waterproof seal between each hatch and the edge of the stowage bin, when closed.

Figure 5:
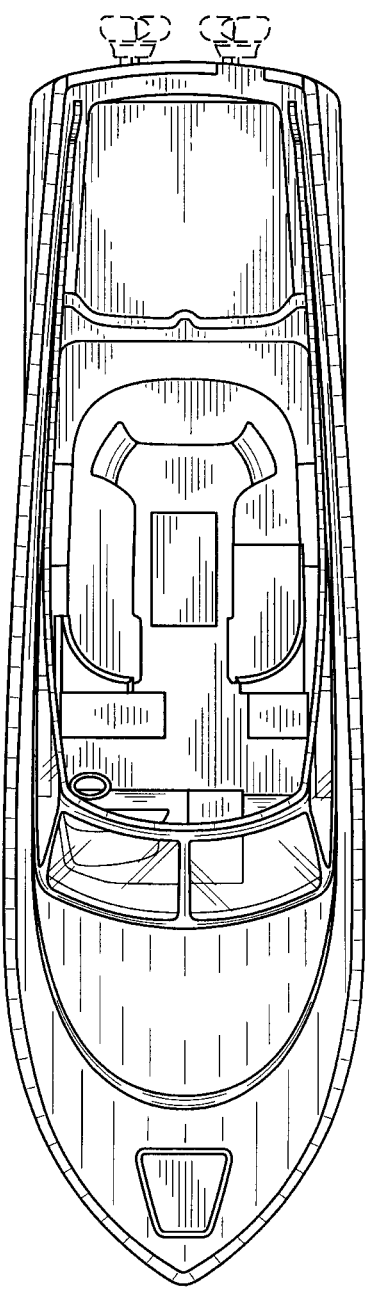
FIG. 5 is a schematic top view of a boat with a convertible top in the fully stowed position, in accordance with one embodiment of the invention.
Figure 6:
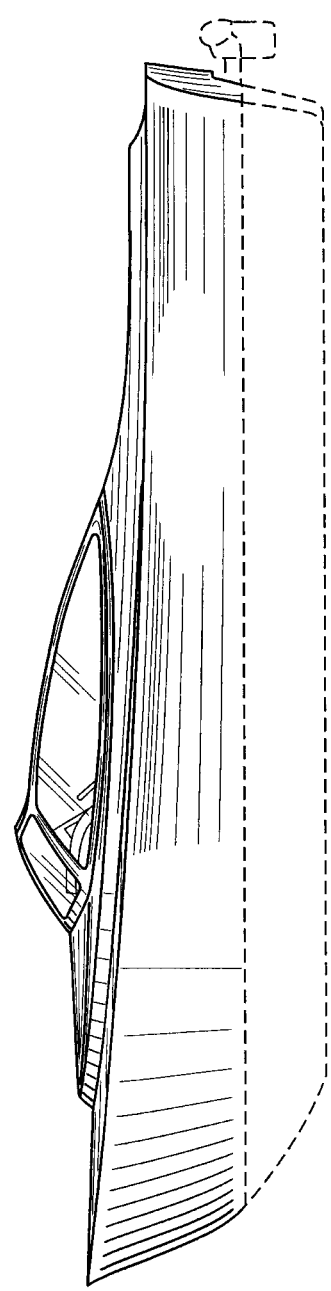
FIG. 6 is a schematic side view of the boat of FIG. 5.

In alternative embodiments, the stowage bin may be covered by a single hatch, by two hatches, or by a larger number of separate hatches, depending upon the specific geometry of the boat 100, open cabin 110, and convertible top. In certain alternative embodiments, the stowage bin and covering hatch, or hatches, may be raised above the height of the surrounding deck (e.g. to provide a headrest for passengers sitting within the rear of the open cabin) or be lowered below the height of the surrounding deck (e.g. to provide additional seating when the hatches are closed). Further embodiments of a water craft with a convertible top fully stowed within a stowage bin can be seen in FIGS. 5 and 6.

Figure 1B:
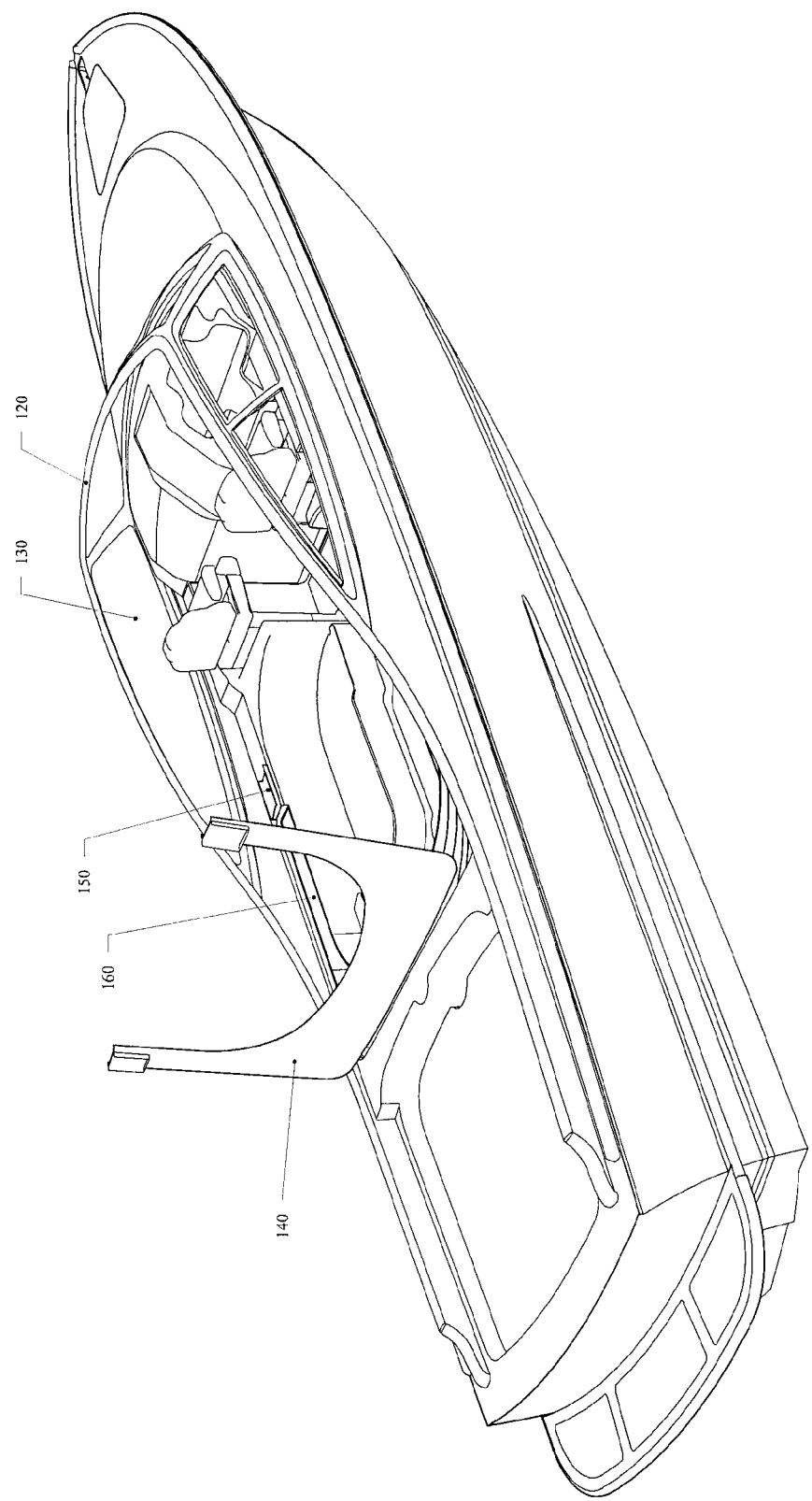
FIG. 1B shows the boat of FIG. 1A, with the stowage hatches open.

FIG. 1B shows the boat 100 of FIG. 1A, with the rear hatch 140 and side hatches 150 for the stowage bin 160 in an open configuration. In this embodiment, the rear hatch 140 and side hatches 150 open by pivoting about one or more hinges mounting the hatches to the outer edges of the stowage bin 160 and/or surrounding structure. The rear hatch 140 therefore pivots up and back towards the stern of the boat 100, while the side hatches 150 open out towards the port and starboard sides of the boat 100 respectively. Opening the rear hatch 140 and side hatches 150 results in the stowage bin 160 being opened, thus allowing the convertible top to be deployed. In an alternative embodiment, one or more hatch may be configured to slide, fold, or otherwise move out of the way in order to open the stowage bin 160.

The rear hatch 140 and side hatches 150 may be opened manually by an operator or be opened automatically when the convertible top is being deployed. In one embodiment, the rear hatch 140 can open automatically while the side hatches 150 can be opened manually. In one embodiment, one or more hydraulic pistons can be used to open the rear hatch 140 and/or the side hatches 150. Alternatively, an electric motor, or any other appropriate means of providing a pivoting force, may be used to open a stowage bin hatch. In an alternative embodiment, contact with the convertible top as it is deployed may be utilized to open one or more of the hatches. For example, in one embodiment the rear hatch 140 may be opened automatically by a hydraulic force, while the side hatches 150 may be forced open by the support legs of the convertible top as they pivot out from the stowage bin during deployment.

In one embodiment of the invention, a hydraulic piston, or pistons, for opening the rear hatch 140 and/or side hatches 150 may be coupled to a hydraulic system of the boat 100, to provide a means of opening and closing the hatch, or hatches. In one example embodiment, the hydraulic piston, or pistons, may be coupled to an electronic and hydraulic system incorporated into the boat 100 for purposes such as, but not limited to, steering and maneuvering the boat 100. Examples of such systems can be found in U.S. Pat. No. 6,230,642, U.S. Pat. No. 6,234,100, U.S. Pat. No. 6,308,651, U.S. Pat. No. 6,386,930, U.S. Pat. No. 6,401,644, U.S. Pat. No. 6,447,349, U.S. Pat. No. 6,453,835, and U.S. Pat. No. 6,604,479, the disclosures of which are hereby incorporated herein by reference in their entireties. A commercially available version of an example steering mechanism comprising a handle with interlinking processors and controls is available from The Talaria Company, Portsmouth, R.I. under the trade name JetStick®.

Figure 1C:
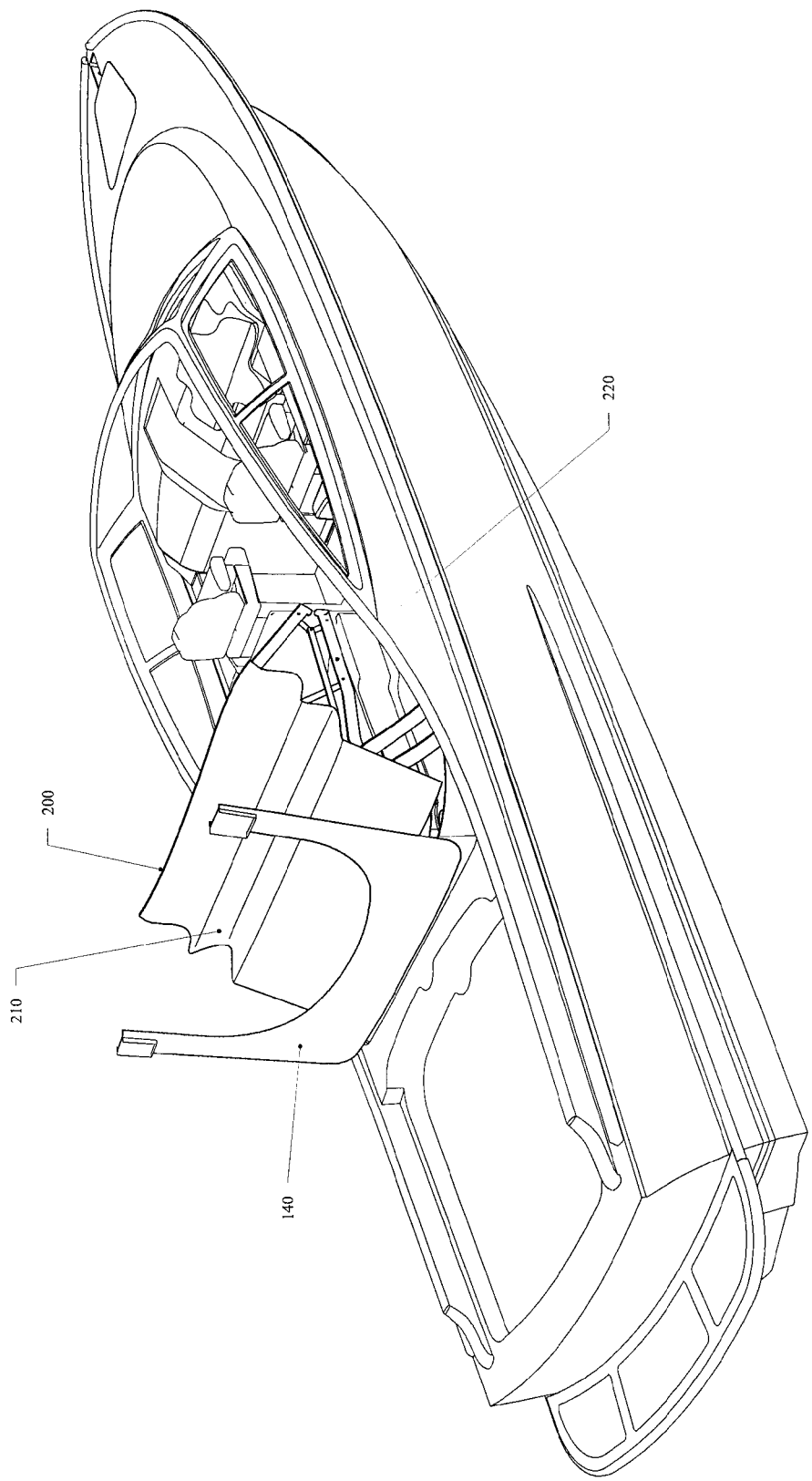
FIG. 1C shows the boat of FIG. 1A, with the convertible top partially deployed.
Figure 1D:
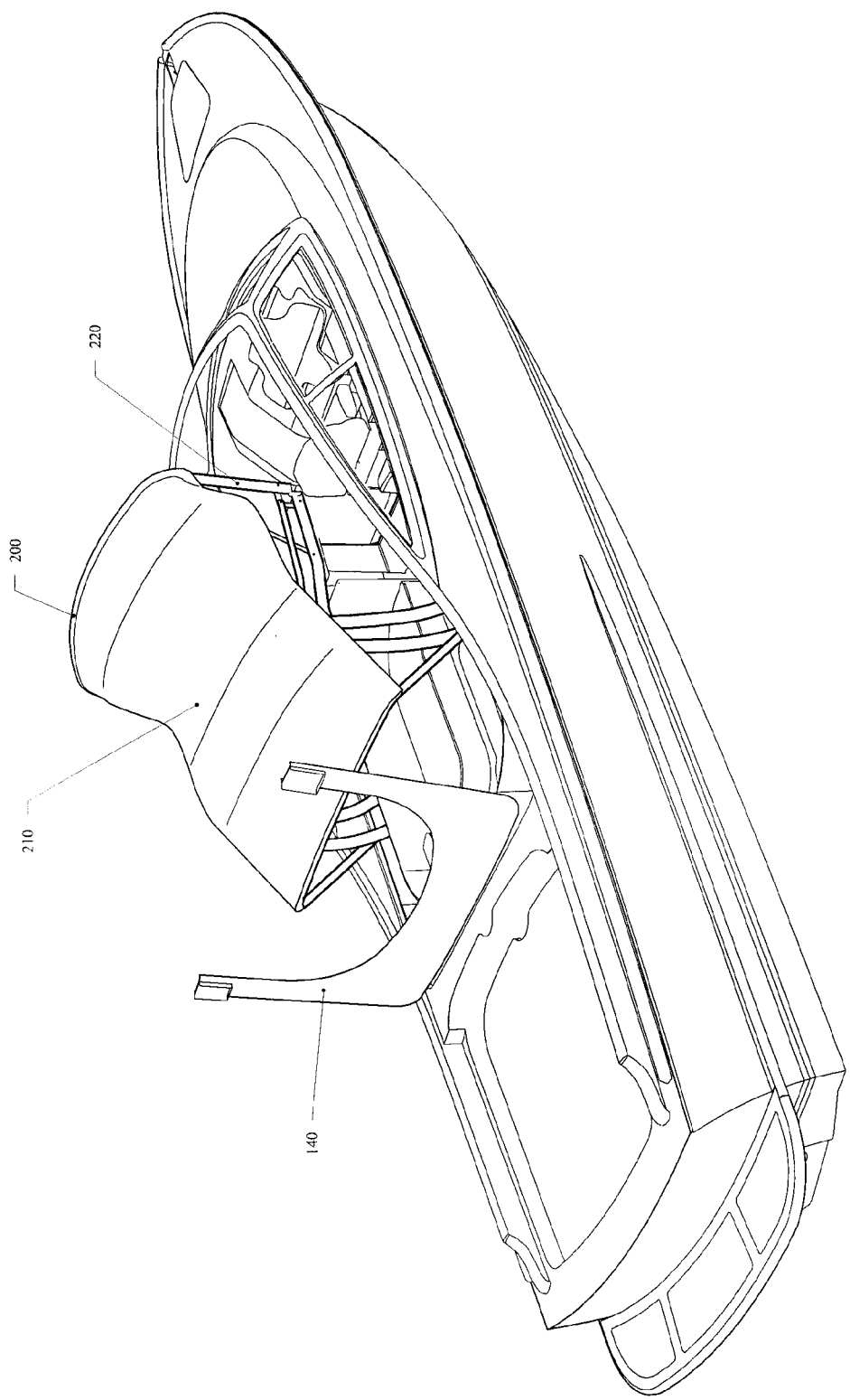
FIG. 1D shows the boat of FIG. 1A, with the convertible top further partially deployed.
Figure 1E:
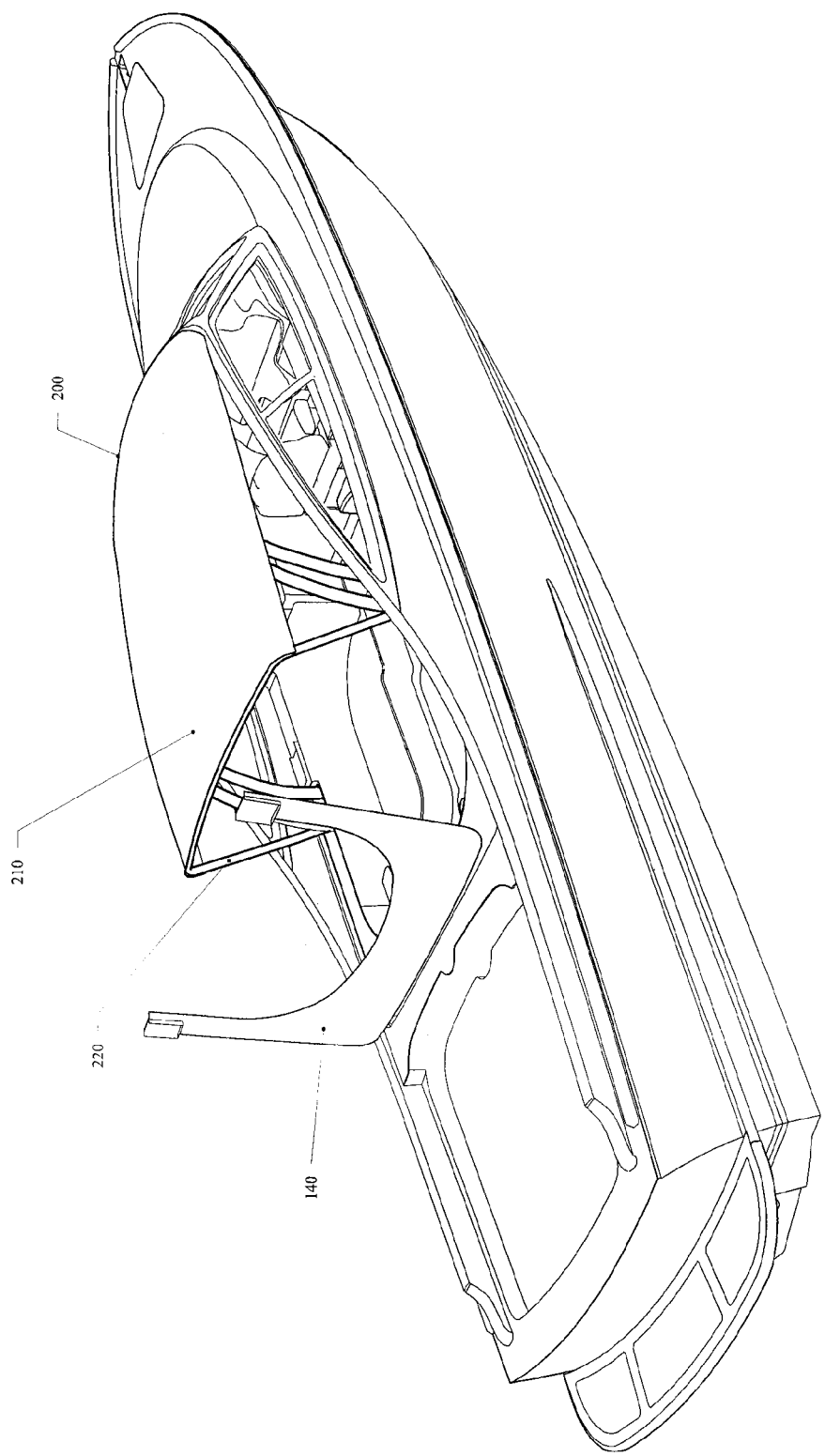
FIG. 1E shows the boat of FIG. 1A, with the convertible top fully deployed.

Once the rear hatch 140 and side hatches 150 have been opened, a convertible top stowed within the stowage bin 160 can be deployed. One embodiment of a convertible top 200 can be seen in FIGS. 1C-1E at various stages of deployment, with FIGS. 1C and 1D showing the convertible top 200 in the process of deploying, and FIG. 1E showing the convertible top 200 fully deployed. In this embodiment, the convertible top can include a canopy 210 and a linkage system 220. The canopy 210 and linkage system 220 may involve any of the materials, and take any of the forms, described herein. In one embodiment, the canopy 210 can include a waterproof canvas material, while the linkage system 220 can include a number of hollow stainless steel struts with an oval cross-section. The linkage system 220 is described in detail below, with respect to FIGS. 2A-2D.

When in a stowed configuration within the stowage bin 160, the canopy 210 and a linkage system 220 are folded to minimize their volume, thus minimizing the required size of the stowage bin 160. Upon deployment, the legs of the linkage system 220 can pivot upwards and forwards about pivot points within the interior of the boat 100. This motion extends the extension arms and top bows of the linkage system 220 and thus deploys the canopy 210 over at least a portion of the open cabin 110 of the boat 100.

The canopy 210 may be attached to the top bows and/or extension arms of the linkage system 220. In one embodiment of the invention, the canopy may be attached by a number of fabric attachments, such as a plurality of ties, hoops, hook and loop fastener attachments, or other appropriate means. As a result, the top bows may be visible from inside the cabin 110. In an alternative embodiment, the attachment means may extend across the full width of the top bows of the linkage system 220, such that they are hidden from sight within the cabin 110 of the boat 100. In one embodiment, the canopy 210 may be permanently attached to the linkage system 220, while in an alternative embodiment the canopy 210 may be releasably attached to the linkage system 220, thus allowing the canopy 210 to be removed for cleaning or replacement.

The deployment and retraction of the convertible top 200 may be controlled by a hydraulic system, an electrical motor and gear assembly, or other appropriate means. In one embodiment, hydraulic pistons may be attached to one or more support legs of the linkage system 220 to provide the force necessary to deploy and retract the convertible top 200. The hydraulic piston, or pistons, may be coupled to an electronic and hydraulic system incorporated into the boat 100 for purposes such as, but not limited to, steering and maneuvering the boat 100, such as those described in the patents referenced above.

The loading on the linkage system 220 may vary during deployment, as the center of gravity of the convertible top 200 moves forward during the deployment motion. As a result, in one embodiment of the invention, the speed of deployment may be regulated and/or varied over the course of deployment to accommodate and compensate for the variation in loading. In one example embodiment, an electronic and hydraulic system incorporated into the boat 100 may be used to regulate the speed of the convertible top 200 during deployment and storage, by adjusting the hydraulic pressure throughout the cycle so as to provide a substantially constant rate of deployment and retraction. In an alternative embodiment, gearing, variation in power supplied to a motor assembly, or other appropriate means, may be used to control and adjust the deployment and retraction of the convertible top 200.

In one embodiment of the invention, separate controls may be incorporated into the boat 100 to control the deployment and retraction of the convertible top 200. These controls may include one or more buttons to initiate the deployment and/or retraction, and/or include a number of additional controls, including buttons, joysticks, switches, keypads, and/or other appropriate devices. In one example embodiment, the stick control system for an electronic and hydraulic system, used in steering and maneuvering a boat, may also be utilized to control the hydraulics associated with the deployment and retraction of a convertible top, with an electrical interconnect being used to switch the stick control from steering and maneuvering control to convertible top control. In one embodiment, a button or switch may be included to allow a user to switch between steering and maneuvering control to convertible top control. In an alternative embodiment, a touch pad, keypad, or other electronic means may be used to select functions to be controlled by the stick control system, or to control one or more control functions directly. Example stick control systems are disclosed in the above-mentioned patents, that are incorporated by reference herein.

A header may be incorporated into the linkage system 220 to hold the front of the canopy 210 in position when deployed. In one embodiment, this header may be configured to mate with the windshield frame 120, such that the header fits snugly over or into the edge of the windshield frame 120 to hold the convertible top 200 in the correct position and provide a seal between the edge of the canopy 210 and the edge of the windshield frame 120. Guides may also be included in the header and/or the windshield frame 120 to insure that the convertible top 200 correctly mates with the windshield frame 120 despite any loading being applied to the canopy 210 during deployment.

Once the convertible top 200 has reached the fully deployed position, as shown in FIG. 1E, one or more locking mechanisms may be used to releasably lock the header of the convertible top 200 to the windshield frame 120. These locking mechanisms may be incorporated into the header of the convertible top 200, and/or be incorporated into the windshield frame 120. The locking mechanisms may include any appropriate releasable locking means including, but not limited to, a sliding mechanism, a lever, a latch, a bolt, a clasp, a clamp, a catch, a hook, a cam lock, a magnetic lock, or other appropriate locking mechanism. In one embodiment of the invention, the locking mechanism(s) may be manually actuated, while in an alternative embodiment the locking mechanism(s) may be automatically actuated upon contact between the convertible top 200 and the windshield frame 120. In embodiments including automatically actuated locking mechanisms, proximity switches, pressure sensors, or other appropriate devices may be utilized to trigger the locking mechanism(s).

In certain embodiments of the invention, a user must unlock the locking mechanism(s) prior to the convertible top 200 being retracted. In an example embodiment, sensors may be incorporated into the locking mechanism(s) to allow the convertible top 200 control system to sense when the header of the convertible top 200 is locked to the windshield frame 120. As such, the control system may be configured to only allow retraction of the convertible top 200 to be initiated once all locking mechanisms between the header and the windshield frame 120 have been released. In certain embodiments a warning light, buzzer, or other appropriate indicator, may be incorporated into the boat to alert a user that the convertible top 200 and windshield frame 120 are locked together. In an alternative embodiment, the locking mechanism(s) may be automatically released by the control system when an instruction to retract the convertible top 200 is received.

Figure 1F:
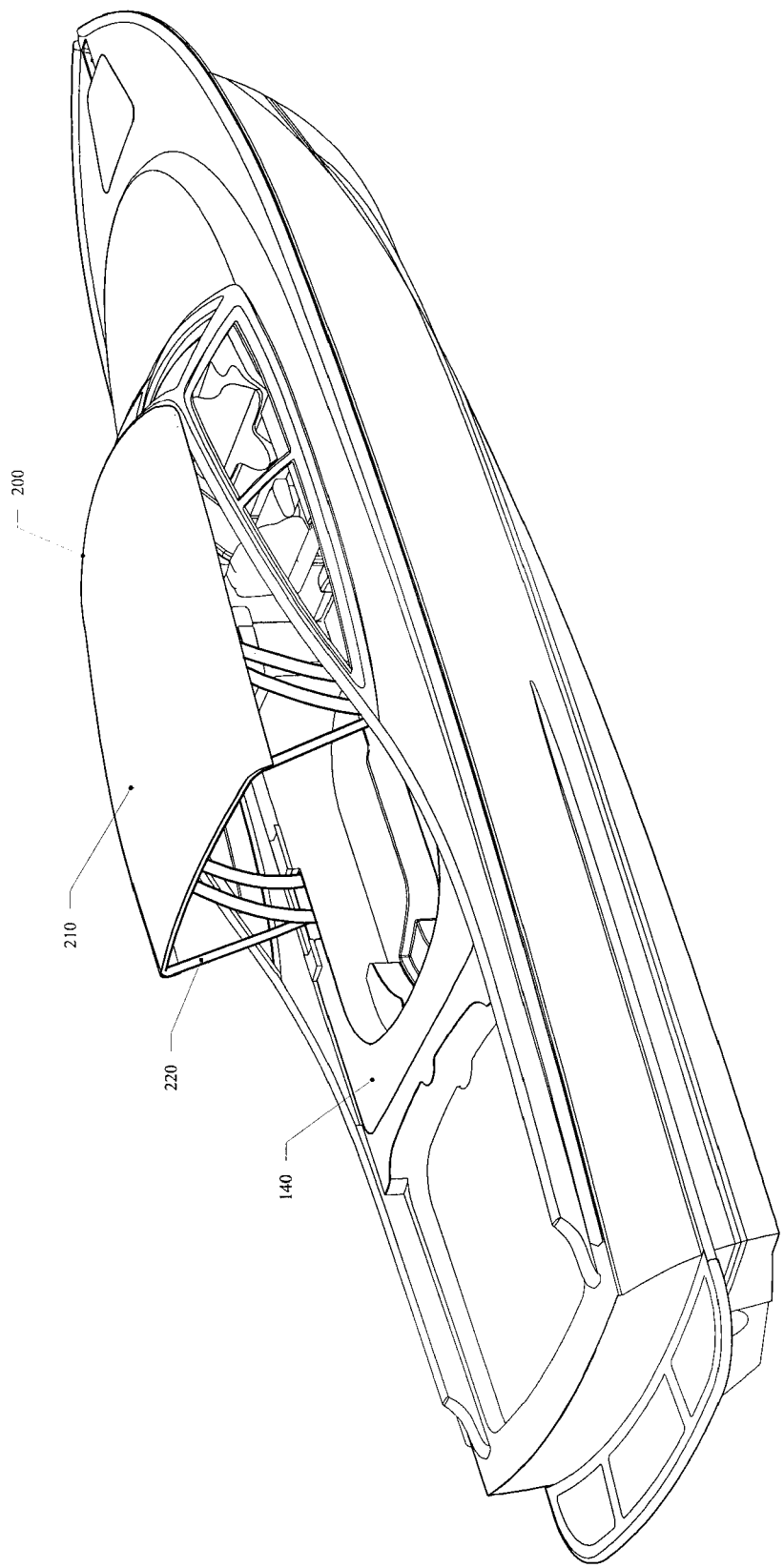
FIG. 1F shows the boat of FIG. 1A, with the convertible top fully deployed and with the stowage hatches closed.

Once fully deployed and locked in place, one or more of the hatches may be closed to seal the stowage bin 160, thus protecting the stowage bin from the elements while also allowing passengers to sit on, or step over, the stowage bin. In one embodiment of the invention, as shown in FIG. 1F, the rear hatch 140 and both side hatches 150, can all be closed once the convertible top 200 has been fully deployed to provide unrestricted access to the aft sundeck. In an alternative embodiment, the rear hatch 140 may be re-closed after deployment of the convertible top 200, while the side hatches 150 remain open, to accommodate the support legs of the convertible top 200.

When fully deployed, the convertible top 200 still provides full, open access into and out of the cabin 110 of the boat 100 through the rear of the cabin 110. As a result, the convertible top 200 can be left in the deployed configuration while docked, without restricting access to the cabin 110 in any way. This can also be beneficial when the boat is being used for recreational pursuits, such as, but not limited to, fishing or waterskiing, by allowing easy movement between the cabin and the rear deck of the boat 100. The open rear of the cabin 110 also provides unrestricted view towards the stern of the boat 100, which may be important, for example, in waterskiing type activities, where it is necessary for the operator to have a clear view of the water-skier from the cabin 110 of the boat 100.

An open exit to the rear of the cabin 110 can also provide significant safety advantages over convertible tops that fully enclose the cabin of a boat. In the event of an emergency, such as, but not limited to, fire, hull breach, or capsizing, an opening at the rear of the cabin would provide a clear exit for passengers, whereas a completely enclosed cabin would significantly hinder the exit of passengers from a boat cabin.

In one embodiment of the invention, one or more curtains may be releasably attached to a portion of the convertible top 200, when deployed, to provide a covering for the open rear and/or open sides of the cabin 110. These curtains may be used, for example, to protect the cabin 110 from the elements, provide additional security for the cabin 110, or to provide additional shade for passengers. The curtains may be adapted to be stowed within a stowage bin on the boat 100. In an alternative embodiment, one or more flexible or stiff cover elements may be adapted to releasably attach between a portion of the deployed convertible top 200 and an edge of the cabin 110 in place of the one or more curtains. These cover elements may be constructed from any appropriate material, including, but not limited to, a plastic, a fabric, a wood, a metal, a composite material, or combinations thereof.

In some embodiments of the invention, care should be taken when retracting and stowing the convertible top to make sure the canopy 210 is correctly and completely stowed within the stowage bin 160. Failure to correctly store the canopy 210 may result in one or more hatches being unable to close, or possibly result in damage being caused to the canopy upon closure of the one or more hatches. As a result, in one embodiment of the invention, the retraction of the convertible top 200 into the stowage bin 160 may be paused at one or more predetermined locations, with the convertible top 200 partially, but not completely, retracted, to allow a user to visually inspect and, if necessary, adjust the partially collapsed canopy 210 to ensure that the canopy is folding properly such that it correctly fits into the stowage bin 160. This may be achieved by tucking, folding, or otherwise adjusting the canopy 210. Once the canopy 210 has been adjusted, the user may restart the retraction process by, for example, depressing a start button, to complete the retraction process. In an alternative embodiment, sensors may be employed to pause the retraction process if the canopy 210 is misaligned, while allowing the process to continue without interruption if the canopy 210 does not require adjustment. In a further embodiment, mechanical adjustment mechanisms may be utilized to automatically position the canopy 210 in a correct configuration for stowing without user intervention. In yet a further embodiment, elastic elements may be incorporated into the canopy 210 to promote the correct folding of the canopy 210 during retraction.

In general, deploying or retracting the convertible top 200 while the boat 100 is underway at high speed may be harmful to the boat's performance, dangerous for the passengers, and/or potentially damaging to the convertible top 200. As a result, in one embodiment of the invention, a control system for the convertible top 200 may include a restriction, such that the convertible top may only be deployed or retracted when certain conditions are met. For example, in one embodiment of the invention, deployment and/or retraction may only be initiated when the boat's 100 engines are held below a set rpm threshold. This rpm threshold may limit the deployment and/or retraction to low speed and/or idling conditions. This permits top actuation while cruising.

Due to the strength of the linkage system 220 for the convertible top 200, a certain level of dynamic loading may be safely absorbed by the convertible top 200, and associated pivoting mounts. As a result the convertible top 200 may be able to be deployed and/or retracted while the boat 100 is underway, as long as the engines rpm are below the set threshold. This can provide advantages over traditional bimini designs, as the top may be deployed immediately upon the onset of rain or other adverse weather conditions without the need to stop the boat 100 and/or find a safe harbor or anchorage. As the convertible top 200 is deployed automatically upon a deployment function being implemented (such as by depression of a start button) with minimal or no user intervention, this may also be significantly quicker and safer than trying to manually install a bimini top while underway, or even while idling in open and potentially choppy waters.

In an alternative embodiment different, and/or additional, restrictions may be enabled, to limit where and when the convertible top 200 can be deployed and/or retracted. For example, a wind speed sensor may be installed on the boat to limit the deployment and/or retraction of the convertible top 200 to conditions below a set wind speed threshold. A pitch and/or roll sensor may also be installed to limit the deployment and/or retraction of the convertible top 200 to conditions below certain levels of "choppiness" of the water. A user controlled interlock may also be included, such that a user may disable the convertible top 200 so that it cannot be deployed and/or retracted until the lock is removed. This lock may take the form of a switch, button, software-based keypad selection, mechanically lockable cover over the convertible top 200 controls, or other appropriate means. In a further embodiment, restrictions limiting the deployment of the convertible top 200 may be adjustable by a user, within certain set safety limits. Other restrictions limiting the conditions under which the convertible top 200 can be deployed, and/or retracted, may also be included in addition to, or in place of, the above-mentioned restrictions. For example, in certain classes of boat, it may be advantageous to limit deployment and/or retraction to only allow the convertible top 200 to be adjusted while the boat is docked, and/or idling.

Figure 2A:
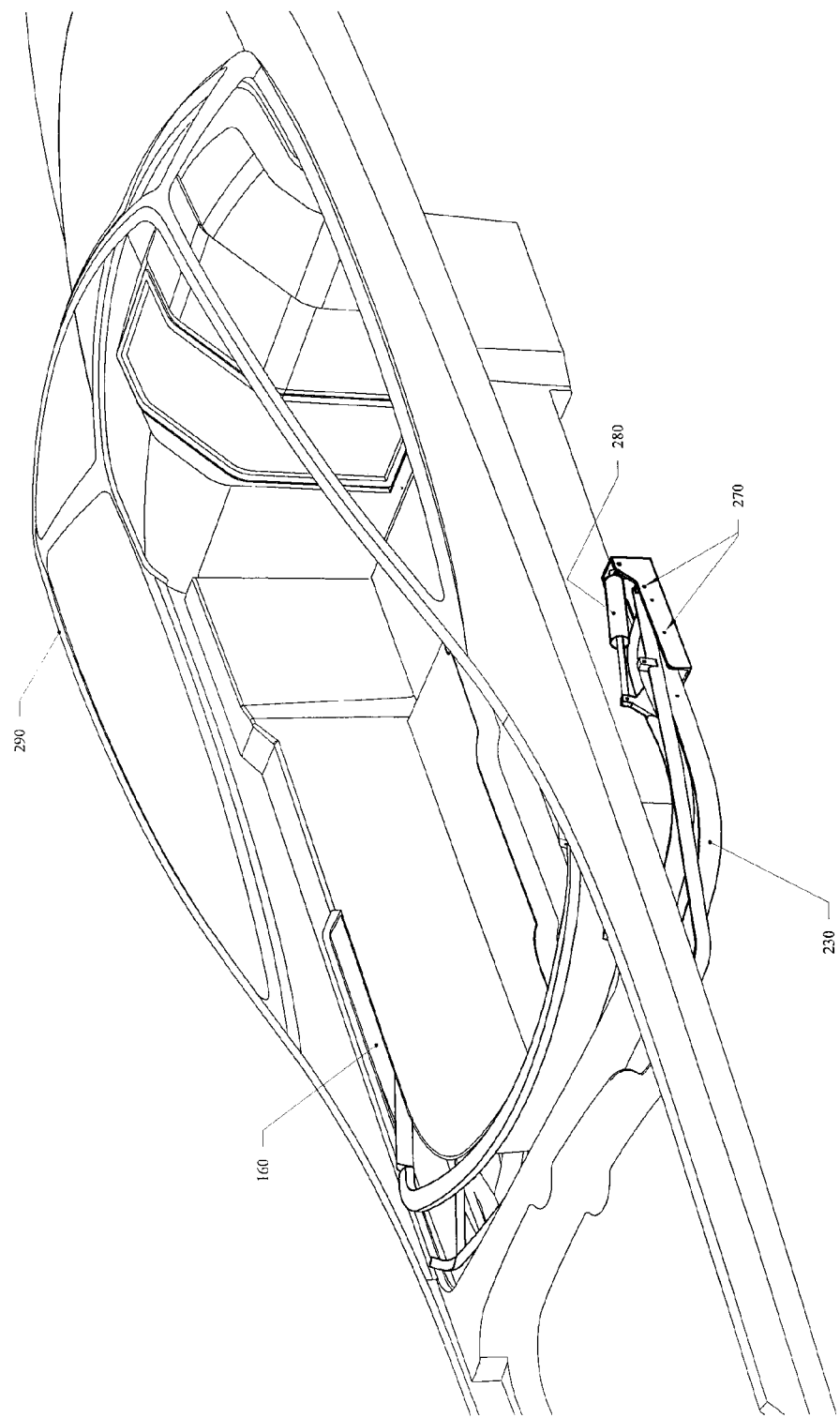
FIG. 2A is a schematic perspective view of a linkage system for a convertible top for a boat in the fully stowed position, in accordance with one embodiment of the invention.

An example of a generally symmetrical linkage system 220 for a convertible top 200 is shown in FIGS. 2A to 2D. In FIG. 2A, the linkage system 220 is shown in the stowed configuration within an open stowage bin 160, with the upper shell of a boat 290, including a windshield, shown for reference. For clarity, the linkage system 220 is shown without a canopy attached. The hatches for the stowage bin 160 have also been removed for clarity.

Hydraulic pistons 280 are connected from an anchor point on each side of the hull of the boat, and within the base of the stowage bin 160, to the support legs 230 of the linkage system 220. As a result, the hydraulic pistons 280 can provide a pulling force to the support legs 230 to pivot the support legs 230 about their pivot points 270 and deploy the convertible top 200. In one embodiment, the hydraulic pistons 280 may be two 800 psi cylinders, while in a second embodiment two 1000 psi cylinders may be employed. In alternative embodiments, larger or smaller hydraulic pistons 280 may be used, depending upon the size and weight of the convertible top 200, and the loading on the system during deployment and retraction.

In one embodiment of the invention, the canopy, when deployed, may be about 14 ft long by about 8 ft wide. The weight of the convertible top 200 may be from 300 lbs to 450 lbs, with a center of gravity approximately 7 ft forward of the pivot points 270 when fully deployed. In alternative embodiments of the invention, the canopy may be designed to cover a larger or smaller cross-sectional area, with any length to width ratio, to fit the specific boat and/or cabin of interest. Lighter and heavier convertible tops 200, and differently located centers of gravity, are also envisioned, depending upon the specific size, shape, and loading requirements of a particular convertible top 200.

In an alternative embodiment, a greater or lesser number of hydraulic pistons 280 may be employed to deploy and retract the convertible top 200. In a further alternative embodiment, the hydraulic pistons 280 may be anchored at different locations within the boat. For example, the hydraulic pistons 280 could be anchored to the interior of the hull, interior decking and/or walls, or any other support structure fixed within the shell of the boat. The hydraulic pistons 280 may also be anchored to the rear of the pivot points 270 of the support legs 230, such that they provide a pushing force to deploy the convertible top 200 and a pulling force to retract and stow the convertible top 200.

In order to minimize the required size of the stowage bin 160, and thus minimize the portion of the open cabin that is taken up be the convertible top 200 when stowed, the linkage system 220 should be configured to fold up into as compact an area as possible. As a result, the shape, size, and configuration of each component of the linkage system 220 can be carefully chosen to allow for compact stowage, while still allowing for the large size and strength of the convertible top 200 when deployed.

In one embodiment, the stowage bin may include guiding mechanisms to accurately position each component of the linkage system 220 as the struts are lowered into the stowage bin 160. These guiding mechanisms may take the form of passive devices, such as, but not limited to, slots, rails, or angled walls, or incorporate active guiding devices and sensors to ensure correct positioning on each component of the convertible top 200. The problem of accurately locating the components of the convertible top 200 within the stowage bin may be limited by accurately machining each components and linkage of the linkage system 220, to minimize the "play" in the system. The locating of the components within the stowage bin 160 can also be effected by the position of the canopy 210 as it is folded into the bin. This problem may be alleviated by making sure that the canopy 210 folds into the bin 160 in a compact, repeatable way, by either employing guiding devices to correctly position the canopy 210, or by pausing the retracting cycle before the convertible top 200 is fully stowed, to allow a user to adjust the position of the partially folded canopy by hand, as necessary.

Figure 2B:
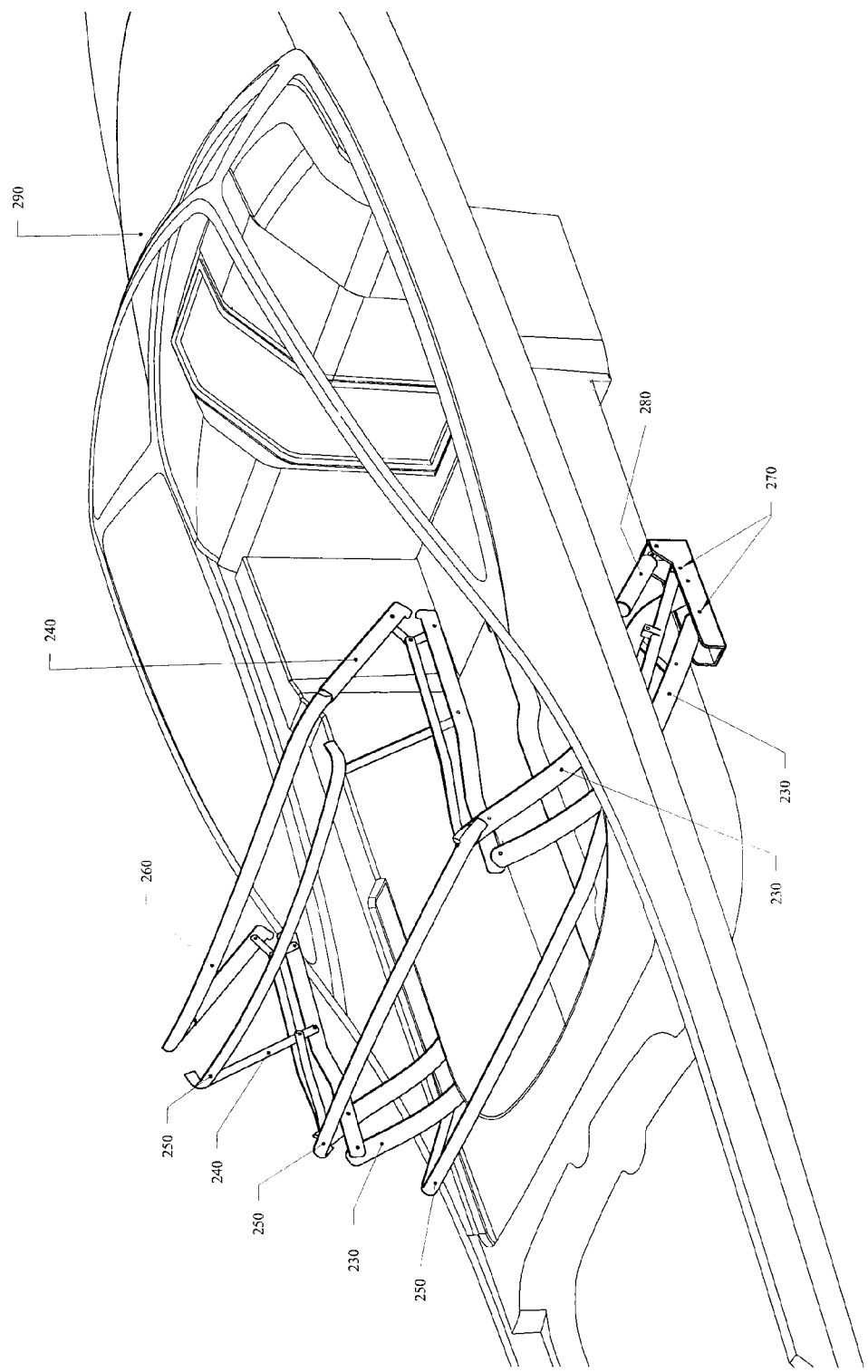
FIG. 2B shows the linkage system of FIG. 2A in partially deployed configuration.
Figure 2C:
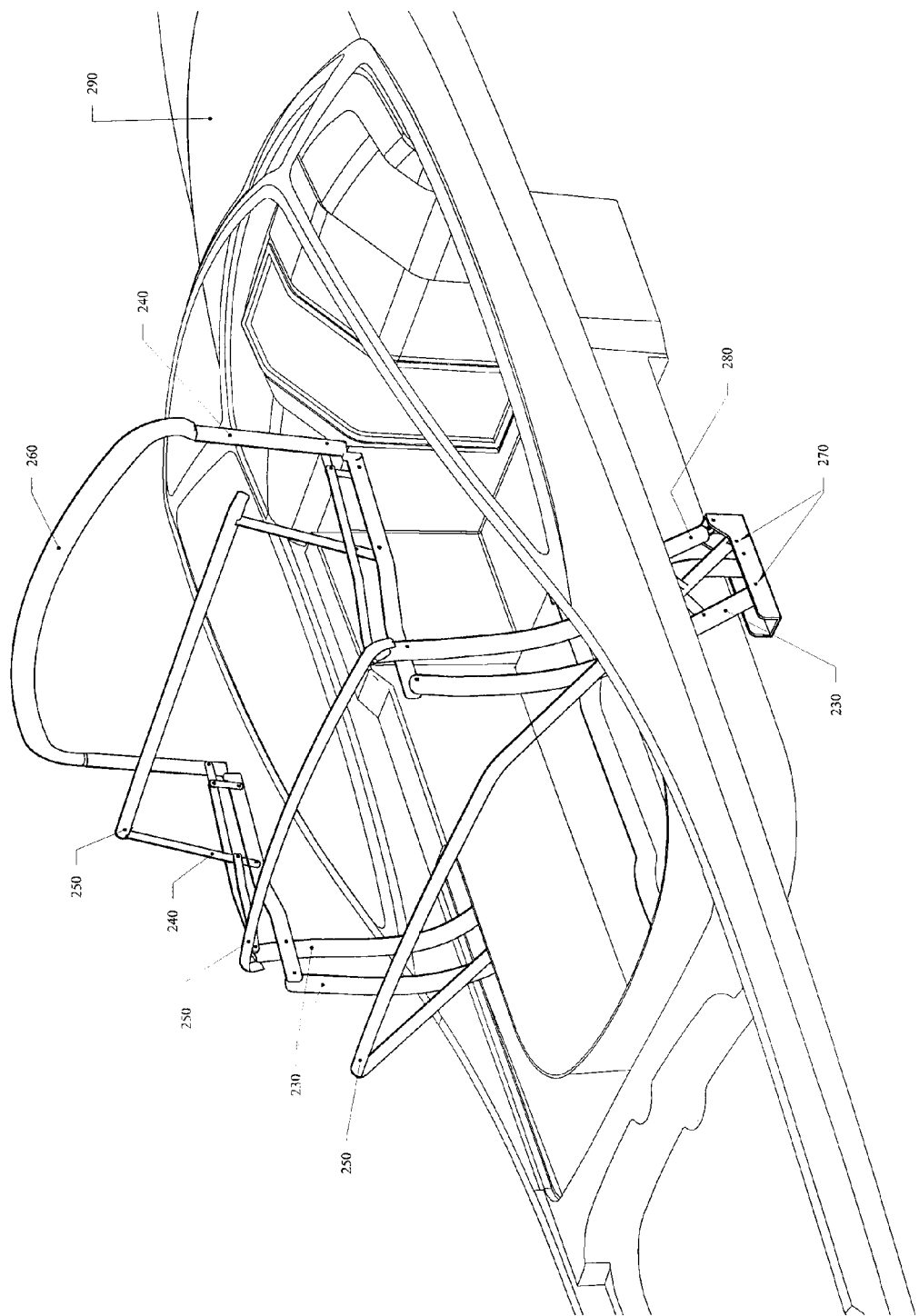
FIG. 2C shows the linkage system of FIG. 2A in further partially deployed configuration.

FIGS. 2B and 2C show the linkage system 220 for the convertible top 200 in two partially deployed positions, with FIG. 2C showing a more advanced location in the deployment cycle than FIG. 2B. Again, the canopy 210 has been removed from the figures for ease of viewing of the linkage system 220. In these figures, the hydraulic pistons 280 have applied a pulling force to the support legs 230 of the linkage system 220, resulting in the support legs 230 pivoting upwards and forwards about their pivot points 270. This pivoting motion also forces the linkage system to pivot and extend the extension arms 240, top bows 250, and header 260 outwards and forwards towards the front of the cabin.

The canopy 210 is supported by the three top bows 250 and the header 260. In alternative embodiments, a greater or smaller number of top bows 250 may be used to support the canopy 210. In one embodiment, the header 260 may be slideably connected to the extension arms 240, allowing the header 260 to extend forward during deployment to lengthen effectively the extension arms 240 and therefore increase the area covered by the canopy 210. When retracting the convertible top 200 to stow it in the stowage bin 160, the header 260 may be slid back into the extension arms 240, thus reducing the length of the extension arms 240 and therefore reducing the required size of the stowage bin 160. Allowing the header 260 to extend and retract in this manner allows for a collapsible header assembly that can reduce the overall stowage volume for the system when the canopy is stowed. In an alternative embodiment, the header 260 may be collapsed through a pivoting motion in addition to, or in place of, an extending and retracting motion.

The extending and retracting of the header 260 within the extension arms 240 may be driven by the pivoting of the linkage system 220, or be driven by a separate mechanical, electrical, and/or hydraulic mechanism. For example, the latching system releasably locking the convertible top 200 to the windshield frame may be configured to pull the header forward when locking the header 260 to the windshield frame, and then allowing the header to automatically retract into the extension arms 240 (by spring or other appropriate biasing mechanism) when the latching mechanism is released. Alternatively, the extension and retraction of the header 260 may be carried out manually. In an alternative embodiment, the header 260 may be fixedly attached to the extension arms 240.

In an alternative embodiment, the header 260 may include a mechanism allowing the extension of the header 260 to be adjusted manually during installation, maintenance, and/or reconfiguration of the convertible top 200, while holding the header 260 fixedly in place with respect to the extension arms 240 during deployment and retraction. In this embodiment, the header 260 may be held in place at the end of the extension arms 240 by one or more bolts, or other appropriate releasable locking mechanism, allowing the header 260 to be locked in place during use, but allowing it to be slideably adjusted with respect to the extension arms 240 during installation, maintenance, and/or reconfiguration.

Figure 2D:
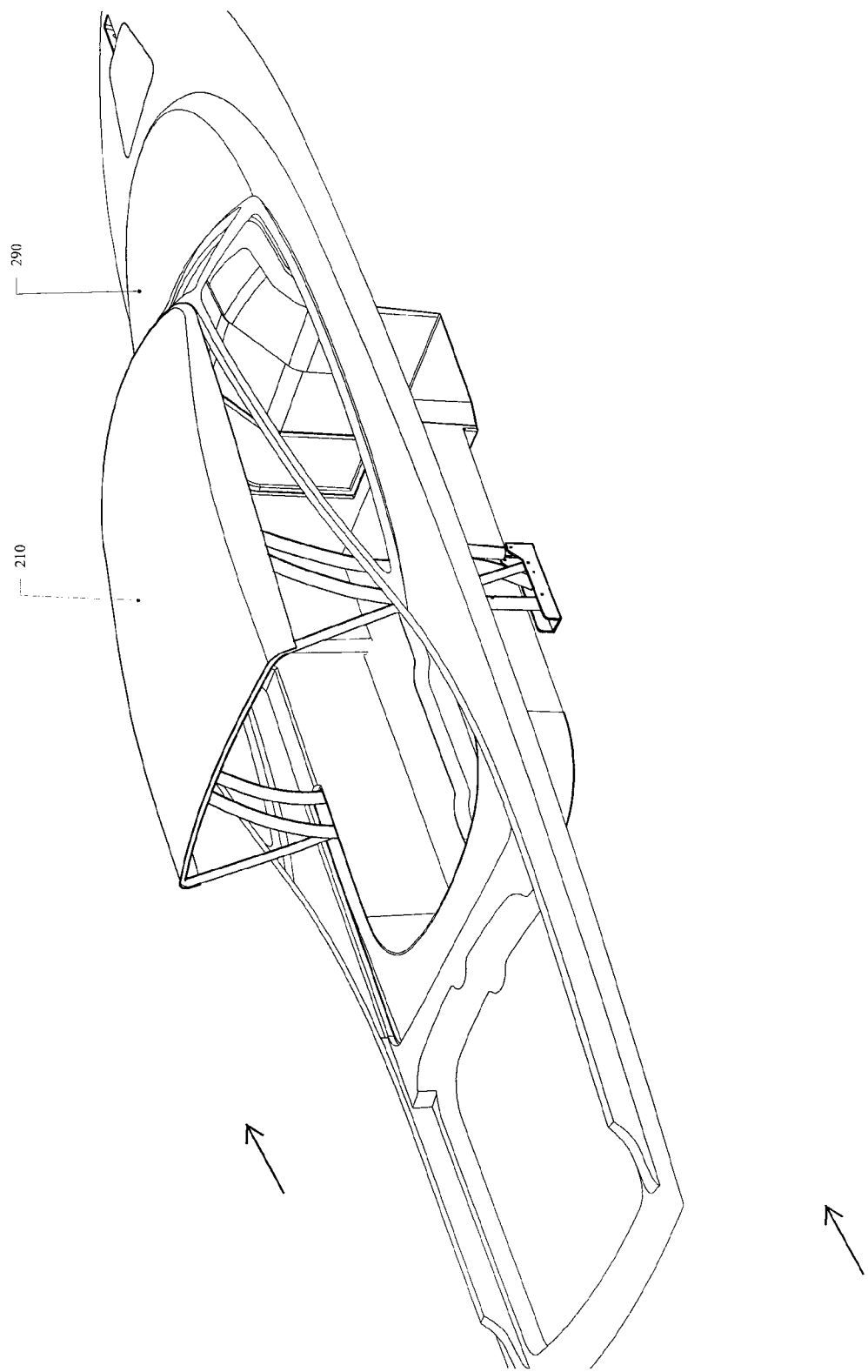
FIG. 2D shows the linkage system of FIG. 2A in fully deployed configuration, with an attached canopy.

The convertible top 200 in a fully deployed configuration, with the canopy 210 in place, is shown in FIG. 2D. As can be seen, the deployed canopy 210 can cover substantially all of, or at least a majority of, the open cabin of the boat, while providing open access and exit to and from the cabin through the opening at the rear of the cabin. It should be noted that retraction of the canopy 210 is carried out in the same manner as the deployment of the canopy 210, with the hydraulic pistons 280 providing a pushing force to the support legs 230 to pivot the legs 230 backwards and down into the stowage bin 160. Throughout this retraction cycle, the extension arms 240, top bows 250, and header 260 will pivot back into a stowed configuration in a substantially mirror image of the deployment cycle.

Figure 3A:
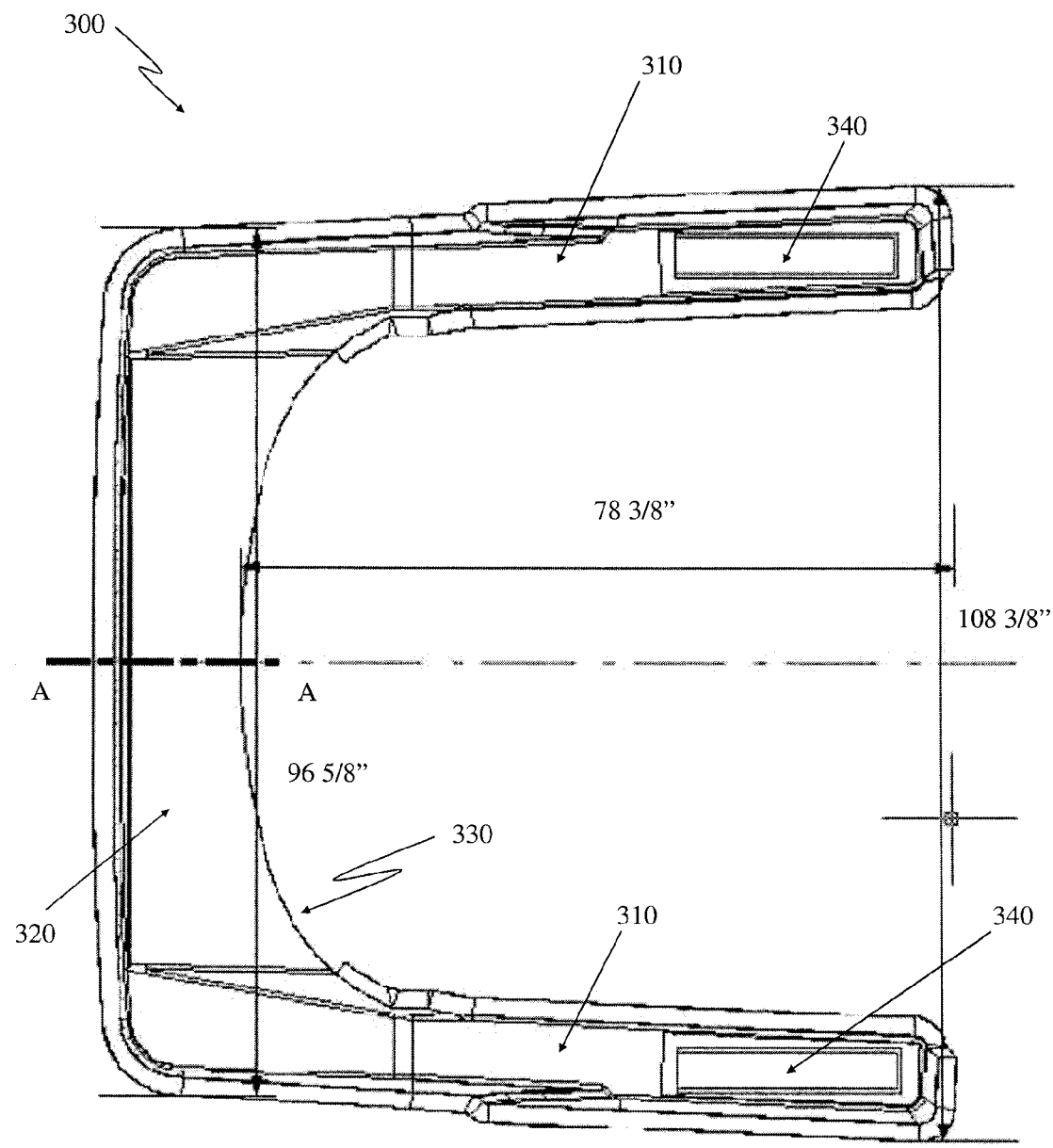
FIG. 3A is a schematic plan view of a stowage bin for holding a convertible top in a stowed position, in accordance with one embodiment of the invention.
Figure 3B:
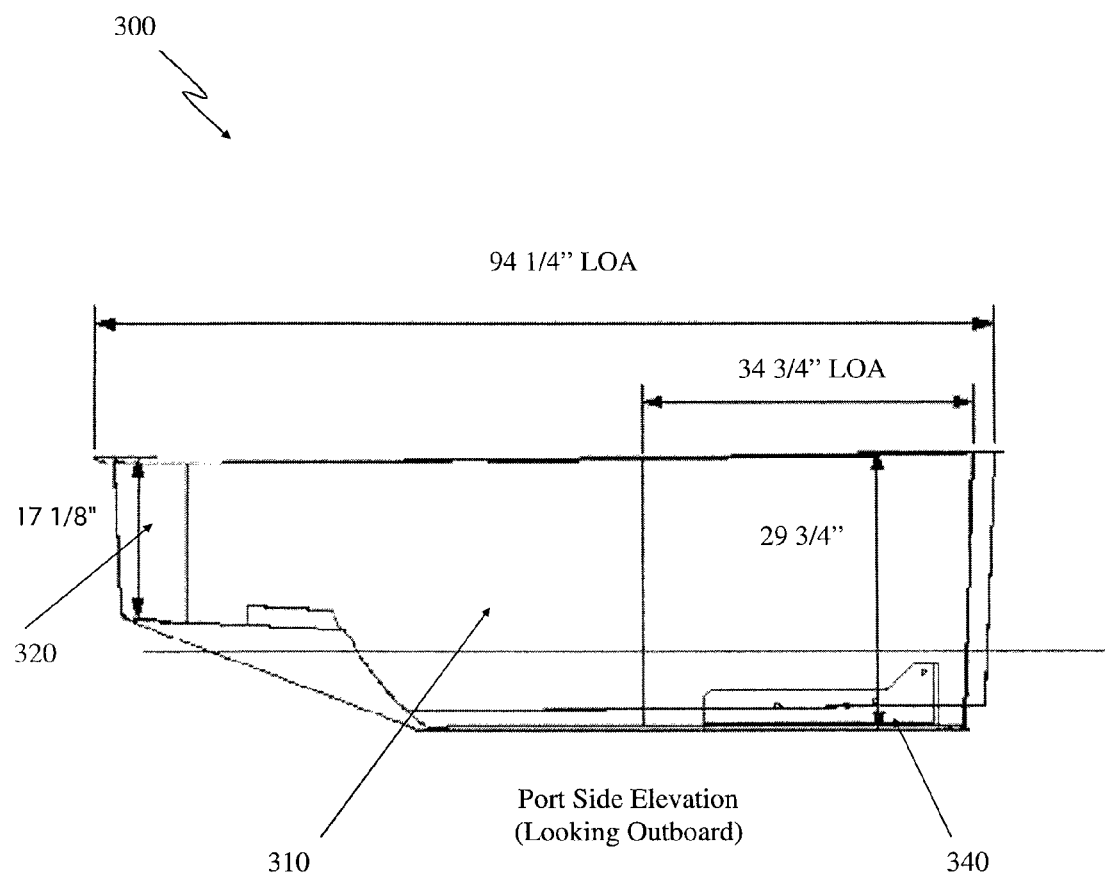
FIG. 3B is a schematic side elevation view of the stowage bin of FIG. 3A.
Figure 3C:
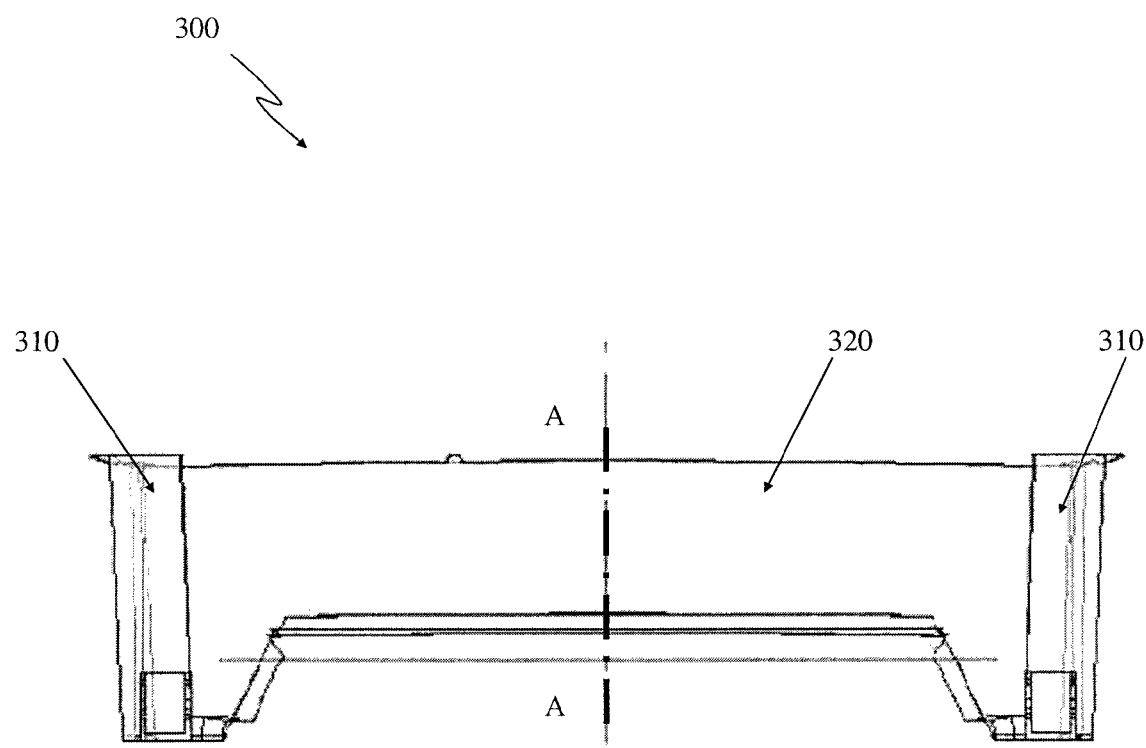
FIG. 3C is a schematic front elevation view of the stowage bin of FIG. 3A.

An example embodiment of a stowage bin 300 is shown in FIGS. 3A-3C. In this embodiment, the stowage bin 300 is substantially configured in a "U" shape, with the leg portions 310 configured to house the support legs and extension arms of a convertible top, and a rear portion 320 configured to hold the top bows and canopy of the convertible top. In this embodiment, for the 14 ft by 8 ft canopy described above, the stowage bin 300 has an overall length of about 94 inches, an overall width of about 106 inches, and a maximum height of less than about 30 inches. The rear portion 320 of the stowage bin 300 has a cross-sectional area of approximately 16 inches by 17 inches at the center of the stowage bin 300 (i.e. through the line A-A). In an alternative embodiment, any one or more of these dimensions may be increased or decreased, depending upon the specific dimensions of the boat, and cabin, on which the convertible top is to be fitted.

It may be advantageous to minimize the volume into which the collapsed canopy may be stowed, while maximizing the area coverable by the canopy when deployed. In one embodiment of the invention, the ratio of the deployed length of the canopy to the length of the canopy when stowed (represented by the height of the rear portion 320) may be at least 6:1. In a further embodiment, this ratio may be at least 8:1. In a further embodiment, the ratio of the deployed canopy length to the stowed canopy length may be at least 10:1. In the example embodiment shown in FIGS. 3A-3C, the ratio of deployed canopy length to stowed canopy length is 168 inches to 17 inches, giving a ratio of approximately 10:1.

The rear portion 320 of the stowage bin 300 may include a curved front 330. This curved front 330 can also function as the back wall of the open cabin of the boat, and may be configured to provide a complimentary shape to the interior of the cabin. Alternatively, a separate structure, such as, but not limited to, a bench, chairs, and/or steps, may be placed in front of the curved front 330 of the rear portion 320, to function as the rear of the cabin. In order to maximize the space within the boat, the stowage bin 300 may also be configured to conform to the dimensions and shape of other structures located to the rear of the cabin of the boat, such as, but not limited to, the engine compartment, other stowage compartments, or other structural features of the boat.

In one embodiment of the invention, the stowage bin 300 may also include anchoring points or locations 340 within the bottom of the leg portions 310 of the stowage bin 300. These anchoring locations 340 can be used to provide solid pivot points and anchoring locations for the proximal ends of the support legs, and the attached hydraulic pistons, of the convertible top.

The stowage bin 300 may be constructed from wood, metal, plastic, fiberglass, or any other appropriate material that can provide the required structural strength, weight requirements, and waterproofing required for the stowage bin 300. In one embodiment, the stowage bin 300 may be constructed from a single piece of molded plastic or fiberglass, which can quickly and easily be fitted within the rear portion of a boat cabin. Drainage ports may be provided.

In an alternative embodiment of the invention, a stowage bin and convertible top may be constructed as a separate device that can be retrofitted to an already existing boat design. By manufacturing the stowage bin and convertible top in a number of sizes and shapes, a boat owner could chose the convertible top of appropriate dimensions, and then fit this assembly within the rear portion of their boat to provide cover for the cabin of that boat. These retro-fittable convertible tops may incorporate many of the advantages of the convertible tops described herein, and allow a boat user to install a stronger, automatically deployable cover that has significant advantages over traditional bimini tops.

Figure 4:
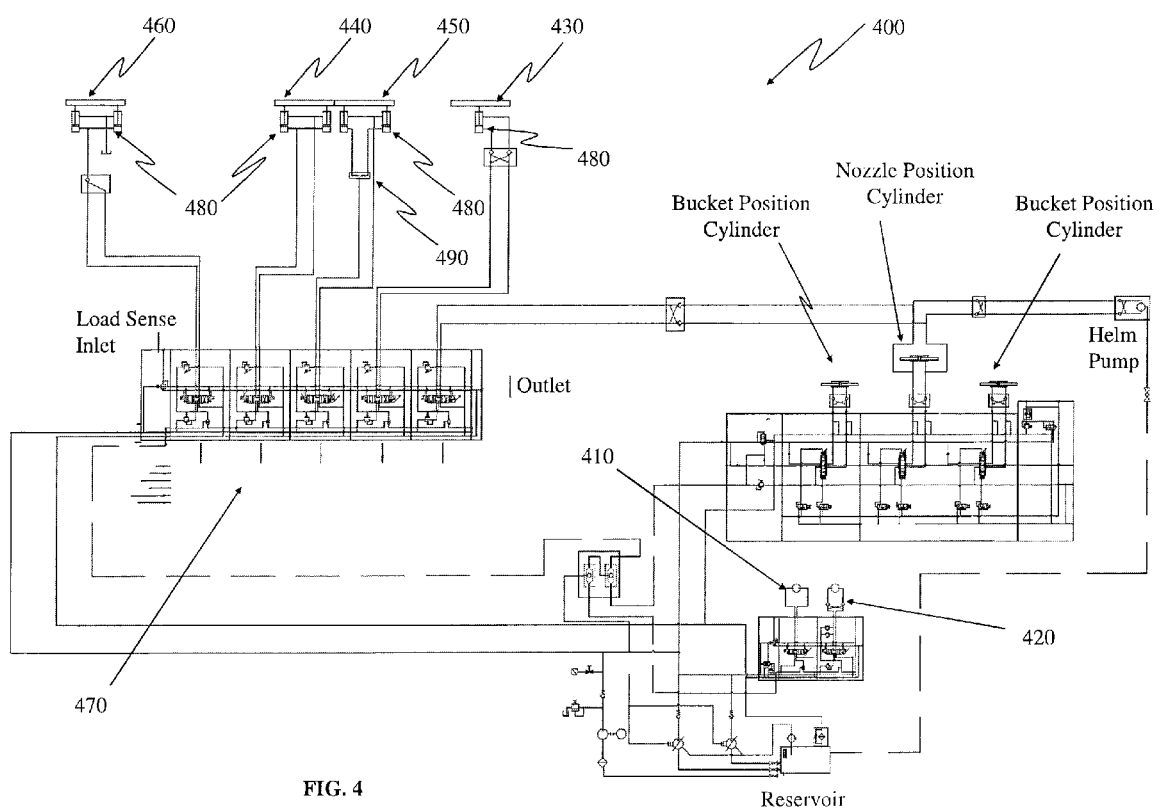
FIG. 4 is a schematic diagram of an hydraulics system for a boat including a convertible top, in accordance with one embodiment of the invention.

FIG. 4 shows an example hydraulics system 400 for a boat with a convertible top. The hydraulics system 400 allows a single control system 470 to control multiple functions on a boat. The hydraulics system 400 of FIG. 4 can control a bow thruster 410, a windlass 420, an engine hatch 430, a convertible top hatch cover 440, a convertible top 450, and a boarding rail 460. The hydraulic system 400 can also control a jet bucket and steering nozzle. In other embodiments of the invention, any combination of hydraulically powered devices, including, but not limited to, those included in the hydraulics system 400 of FIG. 4, may be controlled, depending upon the specific requirements of the boat being used. A description of an example control system incorporating a bow thruster is disclosed in the patents listed above.

In operation, a user can select one or more functions to be controlled by the hydraulics system 400 by selecting the appropriate function on the control system 470. The hydraulics system 400 will then open and close the appropriate valves to direct hydraulic power to the selected functions, as required. The power delivered to each function may be controlled by the user through the control system 470. In one embodiment, the control system 470 may include a computer processor adapted to control at least one of the functions of the hydraulic system 400 based on an input from a user through a user interface. In an alternative embodiment, a mechanical and/or electrical element may be used in addition to, or in place of, the computer processor to control at least one function of the hydraulic system 400.

In this embodiment, both the convertible top hatch cover 440 and the convertible top 450 itself are each powered by two hydraulic pistons 480. For the convertible top 450, each hydraulic piston 480 will provide a pivoting force to a single leg of the linkage system. A flow divider 490 is included within the convertible top hydraulics to control the force being applied by each leg of the linkage system. In an alternative embodiment, no flow divider 490 may be required. When deploying or retracting the convertible top 450, a user can select the convertible top option in the control system 470. This may be done by pressing a button, switch, or slider on a control panel, selecting an option from a screen, or by any other appropriate means. Once the convertible top option has been initiated, the appropriate hydraulic power can be directed to the hydraulic pistons 480 of the convertible top hatch cover 440 and convertible top 450 according to a program pre-programmed into the control system 470, without further user intervention. In an alternative embodiment, the control system 470 may allow a user to control one or more details of the deployment and retraction function, such as allowing the user to pause and/or restart the operation to adjust the canopy prior to the retraction function being completed (as described above). This multi-function control system 400 can therefore allow a boat operator to control multiple elements of the boat quickly and simply, directly from a single control panel located near the helm of the boat.

In one example embodiment, the control panel for deployment and/or retraction of the convertible top 450 can include a two button panel. The first button initiates a system check and arming procedure. This can include, but is not limited to, checking that the boat is operating below the required speed for deployment, checking that the side hatches are open, and checking that any latches are unlocked. Once the system check has been completed, a light (such as, but not limited to, a green LED) may be illuminated, indicating to the operator that the convertible top 450 is ready for deployment or retraction. A second button can then be depressed to initiate the deployment or retraction procedure. In one embodiment the deployment or retraction may only proceed when the button is held down by the operator. Alternatively, the deployment or retraction may be started upon depression of the button, and paused upon a second depression of the button. In an alternative embodiment, a three button panel may be used. In further alternative embodiments, a panel including any appropriate number of buttons may be used.

Example User Operating Instructions and System Operating Sequences

One embodiment of the invention may include a system operating sequence for controlling a convertible top through at least one of a deployment and retraction motion. In addition, one embodiment of the invention may include a series of user operating instructions to ensure that a user correctly and safely deploys and/or retracts the convertible top. Examples of a system operating sequence and associated user operating instructions describing convertible top deployment and retraction are provided in Examples I and II, described below.

Example I

One example system operating sequence for a convertible top using a two button option may include a series of operations for both raising and lowering a convertible top. In one embodiment, the system equipment may include the following elements.

System Equipment Overview

1. Gear:
   a. Top assembly, including: top bows, canvas, header and latches.
   b. Top storage well.
   c. Storage well hatches.
      i. Main aft hatch.
      ii. Port and Starboard side hatches with folding front section.
   d. Side and aft curtains.

2. Hydraulic system:
   a. Two cylinders for movement of top bows.
   b. Two cylinders for movement of aft hatch of storage well.
   c. Two proportional bi-directional valves.
   d. Two main engine drive PTO pumps and one DC electric pump. In this embodiment, all three pumps are load sense and returns are to a common reservoir. These pumps may, in this embodiment, support other systems on vessel including, but not limited to, jet control, bow thruster, windlass and hatch lift.

3. Control system:
   a. A Control Processor. In this embodiment, the control processor may also support a steering mechanism, such as a JetStick® type steering system.
   b. Top Control Panel. This may be located at the helm console and include two rocker switches and two indicator lights, such as, for example, one red and one green light. In this embodiment, the right hand switch is on-off. The second switch may be a double through momentary switch.
   c. Input/Output ("I/O"):
      i. Control panel switches (digital input).
      ii. Control panel indicator light (digital output).
      iii. Side hatch open/close switch (digital input) such as, but not limited to, either a plunger or proximity switch.
      iv. Top bow position (analog input) rudder feedback unit.

v. Engine status rpm and gear selection. This may include a J1939 system, or other appropriate system.
vi. In this embodiment, header latch proximity switches may also be used.
vii. Open and closed switches for the aft hatch (digital input).

In this embodiment, the operations required by the system to deploy a convertible top may include the following steps.

System Operations to Raise Convertible Top

1. Per operators instruction: open side hatches and place boat in safe position.
2. Arm or turn system on:
   a. Actuate the right hand switch on the control panel to "on" position. This powers-up the control processor. In this embodiment, if either of the engine ignitions switches are in the on position the control processor will already be powered up.
   b. Control processor performs system safety check
      i. Verifies that side hatch switches are open
      ii. Verifies engine status
         1. engine off;
         2. OR, engine on but out of gear;
         3. OR, engine on, in Docking Mode and less than 1000 rpm.
   c. In this embodiment, if safety check is satisfied the green indicator light on the control panel is turned on and the top can operate. If safety check is not satisfied the top cannot operate, the red indicator light is turned on, and an error message is displayed on the control processor screen.
3. Movement of top may be initiated by actuating the left hand switch on the control panel. In this embodiment, the top of switch is for up. In this embodiment, if at any point the switch is released, movement is stopped. If required, movement can be reversed by actuating the bottom of switch.
4. Aft hatch is open to near vertical before top moves, sequence is controlled by control processor.
5. Rate of movement of top bows is controlled by control processor based on position feed back. In this embodiment, the total travel time may be approximately 40 seconds. In this embodiment, the last 20% of travel may be at a slower rate.
6. Header is latched to windshield. In this embodiment, a proximity switch may be included to verify latch position.
7. System is turned off, in this embodiment, with the right hand switch on the control panel. If engine switch is on control processor returns to normal steering mechanism operation. If both engines are off control processor powers down.
8. If desired, side and aft curtains can manually be installed.

In this embodiment, the operations required by the system to retract a deployed convertible top may include the following steps.

System Operations to Stow Convertible Top

1. Per operator's instruction remove side curtains, verify side hatches are open, place boat in safe position, unlatch header from windshield.
2. Arm or turn system on:
   a. Actuate the right hand switch on the control panel to "on" position. This powers-up the control processor. If either of the engine ignitions switches are in the on position the control processor will already be powered up.
   b. Control processor performs system safety check
      i. Verifies that side hatch switches are open
      ii. Verifies engine status
         1. engine off;
         2. OR, engine on but out of gear;
         3. OR, engine on, in Docking Mode and less than 1000 rpm.
   c. If safety check is satisfied, the green status light on the control panel is turned on and the top can operate. If safety check is not satisfied the top cannot operate, the red status light is turned on and an error message is displayed on the control processor screen.
3. In this embodiment, movement of top and hatch is initiated by actuating the left hand switch on the control panel. In this embodiment, bottom of switch is for top down. If at any point switch is released, movement is stopped. If required, movement can be reversed by actuating top of switch.
4. Aft hatch is open to near vertical before top moves, sequence is controlled by control processor.
5. Rate of movement of top bows is controlled by control processor based on position feed back. In this embodiment, top may lift off header slowly for approximately 3 seconds, then accelerate. The top travels at speed until the "Safety Position" is reached, where it will have a programmed stop. This position may be about 80% retracted. Total travel time for this phase may be approximately 20 seconds.
6. Per operator guide, the top material should be cleared from linkage by pushing folds aft.
7. Movement is resumes when left switch is actuated again. In this embodiment, the control processor may be programmed only to continue if the control switch is released and re-pressed after a 1 second delay. The final top movement may take approximately 20 seconds. This is followed by the aft hatch closing.
8. System is turned off with right hand switch on control panel. If engine switch is on control processor returns to normal steering mechanism operation. If both engines are off control processor powers down
9. Side hatches should be closed at this point.

A series of user operating instructions may be used in conjunction with this system operating sequence to allow a user to correctly and safely deploy and/or retract the convertible top. An example set of user operating instructions to deploy the convertible top may include the following steps.

Deploying the Convertible Top to the UP Position

1. If boat is dockside make sure engine is off or in neutral. If boat is away form dock make sure the boat is in a safe location. Steer boat head to wind or head to waves, which ever is more severe. Place boat in Docking Mode with throttle at idle.
2. Open the port and starboard top well covers. The top will not rise unless this is completed.
3. Turn on power top. The convertible top control panel has two rocker switches. The right hand switch when actuated will arm the system. Verify that the green indicator light comes on signifying system is ready to run. (If the red light comes on instead verify that previous steps where performed fully and check the steering mechanism control box screen for error messages).
4. Activate the power top button at the helm by pressing the top of the left hand switch on the control panel. The convertible top storage well hatch cover will rise to its near vertical position and halt. The top will rise out of the well to its full up position and the storage well cover will return to its closed position. In this embodiment, the total time for this is approximately 40 seconds.
5. Pull down on the starboard grab handle, making sure the latch hook slots and engages into its receiver. Move to the port side and engage the hook into the receiver then latch it by rotating the latch handle 180° toward the grab handle. Return to the helm and fully latch the starboard handle.

6. Close the port and starboard top well covers with the forward section latched in the cup holder position.
7. Turn off the power top using the right hand switch at the control panel on the helm.
8. Install any side or aft curtains you prefer.

In addition, example user operating instructions to retract and stow the convertible top may include the following steps.

Retract and Stow Top

1. If boat is dockside make sure engine is off or in neutral. If boat is away form dock make sure the boat is in a safe location. Steer boat head to wind or head to waves, which ever is more severe. Place boat in Docking Mode with throttle at idle.
2. Remove any side or aft curtains you may have installed and store appropriately.
3. Open the port and starboard top well covers. The top will not retract unless this is completed.
4. Turn on power top. The convertible top control panel has two rocker switches. The right hand switch when actuated will arm the system. Verify that the green indicator light comes on signifying system is ready to run. (If the red light comes on instead verify that previous steps where performed fully and check the steering mechanism control box screen for error messages).
5. Unlatch port and starboard latches by rotating the handle 180° away from the outboard top pull down grab handles. Press the latch hook forward if necessary to release the latch from the receiver, you may need to move the top up or down by using the pull down handle.
6. Actuate the power top button at the helm to retract the top by pressing the lower side of the left control switch. The rear hatch will rise to a near vertical position; the top will then lift off of the windshield header. The top should lift off the windshield header slowly for approximately 3 seconds, then accelerate to its safety position (approximately 80% retracted). In this embodiment, the total time in motion may be approximately 20 seconds.
7. Move to the rear of the cockpit and clear any top material from the convertible top linkage by pushing the top material folds aft. Make sure the top material that is lying on the area above the seat back is pushed into the well. This will prevent any pinching or puncturing of the top materials and assure the top will fully retract into the storage well.
8. Move back to the helm and continue activation of the power top switch. The top will fully retract into the well and the storage hatch will return to its closed position. In this embodiment, the total time to the fully stored position may be approximately 20 seconds.
9. Close the port and starboard top well covers and replace any cushions that may have been displaced.
10. Turn off the power top using the right hand switch at the control panel on the helm.

Example II

Another embodiment of the invention example system operating sequence for a convertible top may include a series of operations for both raising and lowering a convertible top using a three button user interface and/or system option. In this embodiment, the system equipment may include the following elements.

System Equipment Overview

1. Gear:
   a. Top assembly including: top bows, fabric covering, header and latches.
   b. Top storage well.
   c. Storage well hatches.
      i. Main aft hatch.
      ii. Port and Starboard side hatches with folding front section.
   d. Side and aft curtains.
2. Hydraulic system:
   a. Two cylinders for movement of top bows.
   b. Two cylinders for movement of aft hatch of storage well.
   c. Two proportional bi-directional valves.
   d. Pilot Check valve and pressure compensating valve.
   e. Two main engine drive PTO pumps and one DC electric pump. All three pumps may be load sense and returns may be to a common reservoir. These pumps may also support other systems on vessel including, for example, jet control, bow thruster, windlass and hatch lift.
3. Control system:
   a. A Control Processor. This control processor may also support a steering mechanism, such as, for example, a JetStick® style steering mechanism system.
   b. Top Control Panel. This may be located at the helm console and include three rocker switches and two indicator lights, for example, one red and one green light. The left hand switch may be an on-off switch. The second two switches may be, in this embodiment, double throw momentary switches to operate the hatch lid and the top.
   c. I/O.
      i. Control panel switches (digital input).
      ii. Control panel indicator light (digital output).
      iii. Side hatch open/close switch (digital input) such as, for example, either a plunger or proximity switch.
      iv. Top bow position (analog input) such as a linear feed back feedback unit. In an alternative embodiment, a string pot or rotary pot may be used.
      v. Engine status rpm and gear selection. This may include a J1939 system, or other appropriate system.
      vi. Open and closed switches for the aft hatch (digital input).
      vii. In this embodiment, header latch proximity switches may also be used.

In this embodiment, the operations required by the system to deploy a convertible top utilizing a three button option may include the following steps.

System Operations to Raise Convertible Top

1. Per operators instruction; open side hatches and place boat in safe position.
2. Arm or turn system on:
   a. Actuate the left hand switch on the control panel to "on" position. This powers-up the control processor. If either of the engine ignitions switches are in the on position the control processor will already be powered up.
   b. Control processor performs system safety check
      i. Verifies that side hatch switches are open
      ii. Verifies engine status
         1. engine off;
         2. OR, engine on but out of gear;
         3. OR, engine on, in Docking Mode and less than 1200 rpm.
   c. If safety check is satisfied the green indicator light on the control panel is turned on and the top can operate. If safety check is not satisfied the top cannot operate the red indicator light is turned on and an error message is displayed on the control processor screen.
3. Movement of hatch is initiated by actuating the center switch on the control panel. Top of switch raises the hatch, bottom lowers. Position sensors monitored by control processor create an interlock preventing top from moving unless hatch is full open. If movement is attempted when hatch is closed an error message will appears on the control processor display.
4. Movement of top is initiated by actuating the right hand switch on the control panel. Top of switch is for top up. If at any point switch is released movement is stopped. If needed movement can be reversed by actuating bottom of switch.
5. Rate of movement of top bows may be controlled by the control processor based on position feedback. In this embodiment, total travel time may be approximately 40 seconds. In this embodiment, the last 20% of travel is at a slower rate.
6. Header is latched to windshield. In this embodiment, a proximity switch may be used to verify latch position.
7. System is turned off with left hand switch on control panel. If engine switch is on, control processor returns to normal steering mechanism operation. If both engines are off, control processor powers down.
8. If desired, side and aft curtains can manually be installed.

In this embodiment, the operations required by the system to retract a deployed convertible top utilizing a three button option may include the following steps.

System Operations to Stow Convertible Top

1. Per operators instruction, remove side curtains (in this embodiment, the boat should not be underway during this operation), verify side hatches are open, place boat in safe position, unlatch header from windshield.
2. Arm or turn system on:
   a. Actuate the left hand switch on the control panel to "on" position. This powers-up the control processor. If either of the engine ignitions switches are in the on position the control processor will already be powered up.
   b. Control processor performs system safety check
      i. Verifies that side hatch switches are open
      ii. Verifies engine status
         1. engine off;
         2. OR, engine on but out of gear;
         3. OR, engine on, in Docking Mode and less than 1000 rpm.
   c. If safety check is satisfied the green status light on the control panel is turned on and the top can operate. If safety check is not satisfied, the top cannot operate, the red status light is turned on, and an error message is displayed on the control processor screen.
3. Movement of hatch may be initiated by actuating the center switch on the control panel. Top of switch raises the hatch, bottom lowers. Position sensors monitored by the control processor create an interlock preventing top from moving unless hatch is full open. If movement is attempted when hatch is closed an error message will appears on the control processor display.
4. Movement of top may be initiated by actuating the right hand switch on the control panel. Bottom of switch is for top down. In this embodiment, if at any point switch is released, movement is stopped. If needed movement can be reversed by actuating top of switch.
5. In this embodiment, aft hatch must be open to near vertical before top can move.
6. Rate of movement of top bows is controlled by control processor based on position feed back. In this embodiment, top may lift off header slowly for approximately 3 seconds than accelerate. The top travels at speed until the "Safety Position" is reached where it will have a programmed stop. This position is about 80% retracted. In this embodiment, the total travel time for this phase may be approximately 20 seconds.
7. Per operator guide, the top material should be cleared from linkage by pushing folds aft.
8. Movement is resumed when left switch is actuated again. The control processor may be programmed to only to continue if the control switch is released and re-pressed after a 1 second delay. The final top movement should take approximately 20 seconds.
9. Hatch may be closed by activation of the center switch.
10. System may be turned off with left hand switch on control panel. If engine switch is on control processor returns to normal steering mechanism operation. If both engines are off control processor powers down
11. Side hatches should be closed at this point.

A series of user operating instructions may be used in conjunction with this system operating sequence to allow a user to correctly and safely deploy and/or retract the convertible top using a three button option. An example set of user operating instructions to deploy the convertible top utilizing a three button option may include the following steps.

Deploying the Convertible Top to the UP Position

1. If boat is dockside make sure engine is off or in neutral. If boat is away form dock make sure the boat is in a safe location. Steer boat head to wind or head to waves, which ever is more severe. Place boat in Docking Mode with throttle at idle.
2. Open the port and starboard top well covers. The top will not rise unless this is completed.
3. Turn on power top. The convertible top control panel has three rocker switches. The left hand switch when actuated will arm the system. Verify that the green indicator light comes on signifying system is ready to run. (If the red light comes on instead verify that previous steps where performed fully and check the steering mechanism control box screen for error messages.)
4. Actuate the middle button labeled "Hatch" at the helm by pressing the upper control portion of the switch. The rear hatch will rise to a near vertical position. When Hatch is at it's full up position release the button and proceed to next step. At any point while opening the hatch, movement can be stopped reversed and restarted by releasing or actuating the control button.
5. Activate the power "Top" button at the helm by pressing the top of the left hand switch on the control panel. The top will rise out of the well to its full up position. If this function is attempted with the hatch closed no movement will occur and a warning message will appear on the steering mechanism control panel. If necessary, movement can be stopped reversed and restarted by releasing or actuating control button. In this embodiment, the total time for this may be approximately 40 seconds.
6. Pull down on the starboard grab handle, making sure the latch hook slots and engages into its receiver. Move to the port side and engage the hook into the receiver then latch it by rotating the latch handle 180° toward the grab handle. Return to the helm and fully latch the starboard handle.
7. Close the hatch. This is accomplished by pressing and the lower portion of the center switch labeled "Hatch". Hold until hatch is fully closed.
8. Close the port and starboard intermediate well covers with the forward section left open.
9. Turn off the power top using the left hand switch at the control panel on the helm.
10. Install any side or aft curtains you prefer.

In addition, example user operating instructions to retract and stow the convertible top utilizing a three button option may include the following steps.

Retract and Stow Top

1. If boat is dockside make sure engine is off or in neutral. If boat is away form dock make sure the boat is in a safe location. Steer boat head to wind or head to waves, whichever is more severe. Place boat in Docking Mode with throttle at idle.
2. Remove any side or aft curtains you may have installed and store appropriately. Boat is not to be underway during this procedure.
3. Open the port and starboard top well covers. The top will not retract unless this is completed.
4. Turn on power top. The convertible top control panel has three rocker switches. The left most switch labeled On/Off when actuated will arm the system. Verify that the green indicator light comes on signifying system is ready to run. (If the red light comes on instead verify that previous steps where performed fully and check the steering mechanism control box screen for error messages.)
5. Unlatch port and starboard latches by rotating the handle 180° away from the outboard "top pull down grab handles". Press the latch hook forward if necessary to release the latch from the receiver, you may need to move the top up or down by using the pull down handle.
6. Actuate the middle button labeled "Hatch" at the helm by pressing the upper control portion of the switch. The rear hatch will rise to a near vertical position. When Hatch is at it's full up position release the button and proceed to next step. At any point while opening the hatch, movement can be stopped reversed and restarted by releasing or actuating the control button.
7. When the hatch is in the fully open position the top can be retracted and stowed. Actuate the right most button labeled "Top" at the helm to retract the top by pressing the lower side of the control switch. This function can not be preformed if the hatch is not at the fully opened position. If this function is attempted with the hatch closed no movement will occur and a warning message will appear on the steering mechanism control panel. If necessary, movement can be stopped reversed and restarted by releasing or actuating control button. In this embodiment, the top may lift off the windshield header slowly for approximately 3 seconds, and then accelerate to its safety position (approx. 90% retracted). In this embodiment, the total time in motion may be approximately 20 seconds.
8. Move to the rear of the cockpit and clear any top material from the convertible top linkage by pushing the top material folds aft. Make sure the top material that is lying on the area above the seat back is pushed into the well. This will prevent any pinching or puncturing of the top materials and assure the top will fully retract into the storage well.
9. Move back to the helm and continue activation of the power "Top" switch. The top will fully retract into the well. In this embodiment, the total time to the fully stored position may be approximately 20 seconds.
10. After top is in the fully stowed position, close the hatch. This is accomplished by pressing and the lower portion of the center switch labeled "Hatch". Hold until hatch is fully closed.
11. Close the port and starboard top well covers and replace any cushions that may have been displaced.
12. Turn off the power top using the left hand switch at the control panel on the helm.

A commercially available version of a control processor for use in any embodiment of the invention is available from The Parker Hannifin Corporation, Cleveland, Ohio under the name IQAN-MDL Electronic Remote Control. Commercially available rubber feedback units are available, for example, from Raymarine Inc., Merrimack, N.H. In alternative embodiments, other appropriate elements, and combinations of elements, may be utilized, as appropriate. These elements may include, but are not limited to, control processors, feedback units, switches, electronics, hydraulics, pumps, and steering mechanisms.

Alternative embodiments of the invention may include additional and/or different elements. For example, the hydraulic system may include fewer or a greater number of pumps, the control system may include fewer or a greater number of switches, which may be arranged in any appropriate configuration. These switches may include rocker switches, double throw momentary switches, or any other appropriate configuration of switch. In further alternative embodiments, the travel time for the different operations may be reduced or increased, depending upon the specific embodiment and control functions used.

The invention may be embodied in other specific forms without departing form the spirit or essential characteristics thereof. The foregoing embodiments, therefore, are to be considered in all respects illustrative rather than limiting the invention described herein. Scope of the invention is thus indicated by the appended claims, rather than by the foregoing description, and all changes that come within the meaning and range of equivalency of the claims are intended to be embraced therein.

What is claimed is:

1. A retractable cover for a boat, the retractable cover comprising:
    a linkage system;
    a canopy coupled to the linkage system;
    a hydraulically powered control system adapted to control multiple functions on the boat including at least one of a deployment and retraction of the canopy and at least one of a steering function and a propulsion function of the boat; and
    a stowage bin, wherein the stowage bin is located to a rear of an open cabin of the boat, and wherein the canopy can be deployed to cover at least a portion of the open cabin while providing a passenger access and egress from the cabin.
2. The retractable cover of claim 1, wherein a plurality of the multiple functions are powered by the hydraulically powered system.
3. The retractable cover of claim 1, wherein the control system comprises a two button user interface or a three button user interface.
4. The retractable cover of claim 1, wherein the linkage system comprises a plurality of support struts.
5. The retractable cover of claim 4, wherein the plurality of support struts comprise at least one support leg, at least one extension arm, at least one top bow, and at least one header.
6. The retractable cover of claim 4, wherein at least two of the plurality of support struts are coupled together by a pivotable joint.
7. The retractable cover of claim 5, wherein the at least one header is collapsible.
8. The retractable cover of claim 7, wherein the header is adapted to extend from and retract into the at least one extension arm.
9. The retractable cover of claim 5, wherein the at least one header can be releasably coupled to a windshield frame of the boat.
10. The retractable cover of claim 1, wherein the cover is adapted to be deployed while the boat is underway.

11. The retractable cover of claim 1, wherein the control system is adapted to retract the deployed canopy into the stowage bin.

12. The retractable cover of claim 11, wherein a retraction function of the deployed canopy can be paused at a predetermined position to allow for visual inspection and adjustment of the collapsing canopy.

13. The retractable cover of claim 12, wherein the retraction function of the canopy can be paused in response to a signal from at least one sensor.

14. The retractable cover of claim 13, wherein the at least one sensor comprises at least one optical sensor or at least one pressure sensor.

15. The retractable cover of claim 1, wherein the ratio of deployed canopy length to stowed canopy length is at least 6:1, at least 8:1, or at least 10:1.

16. The retractable cover of claim 1, wherein the canopy is adapted to extend over an area of at least 8 ft by 14 ft when deployed.

17. The retractable cover of claim 1, wherein the linkage system comprises at least one pivot point coupling the linkage system to at least one anchoring point located within the stowage bin.

18. The retractable cover of claim 17, wherein the at least one anchoring point and pivot point are adapted to support the combined weight of the linkage system and canopy when deployed.

19. The retractable cover of claim 18, wherein the combined weight of the linkage system and canopy is at least 300 lbs or at least 400 lbs.

20. The retractable cover of claim 18, wherein a center of gravity of the combined linkage system and canopy is approximately 7 ft forward of the at least one anchoring point when deployed.

* * * * *